US012431101B2

(12) United States Patent
Rao et al.

(10) Patent No.: US 12,431,101 B2
(45) Date of Patent: Sep. 30, 2025

(54) DATA PROCESSING METHOD AND APPARATUSES, AND DISPLAY APPARATUS

(71) Applicant: BOE TECHNOLOGY GROUP CO., LTD., Beijing (CN)

(72) Inventors: Tianmin Rao, Beijing (CN); Congrui Wu, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/771,878

(22) PCT Filed: Dec. 1, 2020

(86) PCT No.: PCT/CN2020/133146
§ 371 (c)(1),
(2) Date: Apr. 26, 2022

(87) PCT Pub. No.: WO2022/116002
PCT Pub. Date: Jun. 9, 2022

(65) Prior Publication Data
US 2024/0169937 A1 May 23, 2024

(51) Int. Cl.
*G09G 3/34* (2006.01)

(52) U.S. Cl.
CPC ... *G09G 3/3426* (2013.01); *G09G 2320/0233* (2013.01); *G09G 2320/062* (2013.01)

(58) Field of Classification Search
CPC ......... G09G 3/3426; G09G 2320/0233; G09G 2320/062; G09G 2320/0646; G09G 2360/16
See application file for complete search history.

(56) References Cited

U.S. PATENT DOCUMENTS

2008/0042927 A1* 2/2008 Jung .................... G09G 3/3426 345/39
2010/0020003 A1 1/2010 Feng
(Continued)

FOREIGN PATENT DOCUMENTS

CN 1649403 A 8/2005
CN 104637455 A 5/2015
(Continued)

OTHER PUBLICATIONS

PCT International Search Report (w/ English translation) and Written Opinion for corresponding PCT Application No. PCT/CN2020/133146, mailed Sep. 9, 2021, 8 pages.
(Continued)

*Primary Examiner* — Temesghen Ghebretinsae
*Assistant Examiner* — Karin Kiyabu
(74) *Attorney, Agent, or Firm* — Dority & Manning, P.A.

(57) ABSTRACT

A data processing method is applied to a display apparatus. A display panel in the display apparatus includes pixels, and a backlight module thereof includes backlight units each corresponding to a position of one or more pixels. The method includes: in an (N−1)-th sliding window period, sampling a backlight data set, and storing an obtained N-th backlight data subset, the backlight data set including first backlight values of at least one row of backlight units, the at least one row of backlight units including an M-th roe of backlight units; and in an N-th sliding window period, sampling the backlight data set, storing an obtained (N+1)-th backlight data subset, and calculating a compensation coefficient of at least one pixel, in pixels corresponding to the M-th row of backlight units, that corresponds to the N-th backlight data subset according to the N-th backlight data subset.

17 Claims, 11 Drawing Sheets

(56) References Cited

U.S. PATENT DOCUMENTS

| | | | | |
|---|---|---|---|---|
| 2011/0141166 | A1 | 6/2011 | Ahn et al. | |
| 2017/0083455 | A1 | 3/2017 | Rogers et al. | |
| 2018/0063908 | A1 | 3/2018 | Meng | |
| 2019/0005898 | A1 | 1/2019 | Albrect et al. | |
| 2020/0410945 | A1 | 12/2020 | Ji et al. | |
| 2021/0264560 | A1* | 8/2021 | Hong | G06T 1/20 |

FOREIGN PATENT DOCUMENTS

| | | | | | |
|---|---|---|---|---|---|
| CN | 109887468 | A | * | 6/2019 | |
| CN | 110136657 | A | * | 8/2019 | G09G 3/3406 |
| CN | 111009219 | A | | 4/2020 | |
| CN | 111445879 | A | | 7/2020 | |
| WO | WO 2020/107886 | A1 | | 6/2020 | |

OTHER PUBLICATIONS

Jing et al., “An adaptive caching scheme for multimedia streaming servers”, (w/ English translation), Journal of University of Science and Technology of China, vol. 39, No. 11, Nov. 2009, 17 pages.

Xitiao, “Local Dimming Algorithm for Direct-lit Type LED Backlight in LCD TVs” (w/ English abstract), Hefei University of Technology, Master’s dissertation, Apr. 2015, 76 pages.

* cited by examiner (A)

(B)

| | | | | |
|---|---|---|---|---|
| D(i-2,j-2) | D(i-2,j-1) | D(i-2,j) | D(i-2,j+1) | D(i-2,j+2) |
| D(i-1,j-2) | D(i-1,j-1) | D(i-1,j) | D(i-1,j+1) | D(i-1,j+2) |
| D(i,j-2) | D(i,j-1) | D(i,j) | D(i,j+1) | D(i,j+2) |
| D(i+1,j-2) | D(i+1,j-1) | D(i+1,j) | D(i+1,j+1) | D(i+1,j+2) |
| D(i+2,j-2) | D(i+2,j-1) | D(i+2,j) | D(i+2,j+1) | D(i+2,j+2) |

| | First storage space | Second storage space |
|---|---|---|
| ...... | ...... | ...... |
| (N-1)-th sliding window period | N-th backlight data subset | ...... |
| N-th sliding window period | N-th backlight data subset | (N+1)-th backlight data subset |
| (N+1)-th sliding window period | (N+2)-th backlight data subset | (N+1)-th backlight data subset |
| (N+2)-th sliding window period | (N+2)-th backlight data subset | (N+3)-th backlight data subset |
| ...... | ...... | ...... |

FIG. 13

DATA PROCESSING METHOD AND APPARATUSES, AND DISPLAY APPARATUS

CROSS-REFERENCE TO RELATED APPLICATION

This application is a national phase entry under 35 USC 371 of International Patent Application No. PCT/CN2020/133146 filed on Dec. 1, 2020, which is incorporated herein by reference in its entirety.

TECHNICAL FIELD

The present disclosure relates to the field of display technologies, and in particular, to a data processing method and apparatuses, and a display apparatus.

BACKGROUND

Currently, in a large-sized and high-brightness display apparatus, a direct-type backlight module, for example, may be used to improve the brightness of the display apparatus. The direct-lit backlight module generally includes a plurality of light-emitting diodes (LEDs), and the luminous brightness of the backlight module may be controlled in a partitioned manner through a local dimming technique.

SUMMARY

In an aspect, a data processing method is provided. The data processing method is applied to a display apparatus. The display apparatus includes a display panel and a backlight module, and has a first storage space and a second storage space. The display panel and the backlight module are disposed opposite to each other. The display panel includes a plurality of pixels. The backlight module includes a plurality of backlight units, and each backlight unit corresponds to a position of one or more pixels.

The data processing method includes: in an (N−1)-th sliding window period, sampling the backlight data set by using a sliding window, and storing an N-th backlight data subset obtained through sampling in the first storage space, the backlight data set including first backlight values of at least one row of backlight units, the at least one row of backlight units including an M-th row of backlight units, M being a positive integer, and (N−1) being a positive integer; and in an N-th sliding window period, sampling the backlight data set by using the sliding window after moving, storing an (N+1)-th backlight data subset obtained through sampling in the second storage space, and calculating a compensation coefficient of at least one pixel, in pixels corresponding to the M-th row of backlight units, that corresponds to the N-th backlight data subset according to the N-th backlight data subset.

In some embodiments, the data processing method further includes: in an (N+1)-th sliding window period, sampling the backlight data set by using the sliding window after moving, storing an (N+2)-th backlight data subset obtained through sampling in the first storage space, and calculating a compensation coefficient of at least one pixel, in the pixels corresponding to the M-th row of backlight units, that corresponds to the (N+1)-th backlight data subset according to the (N+1)-th backlight data subset.

In some embodiments, the data processing method further includes: in a last sliding window period, calculating a compensation coefficient of at least one pixel, in the pixels corresponding to the M-th row of backlight units, that corresponds to a last backlight data subset according to the last backlight data subset of the backlight data set, and sampling a next backlight data set of the backlight data set by using the sliding window after moving to obtain a first backlight data subset of the next backlight data set.

In some embodiments, the at least one row of backlight units includes a plurality of rows of backlight units, and the plurality of rows of backlight units include at least three rows of backlight units with the M-th row of backlight units as a middle row of backlight units.

In some embodiments, the M-th row of backlight units is a first row of backlight units, and the backlight data set includes virtual backlight values of at least one row, first backlight values of the first row of backlight units, and first backlight values of a second row of backlight units that are sequentially arranged. A number of virtual backlight values of each row is equal to a number of the first backlight values of the first row of backlight units, and virtual backlight values of the at least one row are zero.

In some embodiments, the at least one pixel corresponding to the N-th backlight data subset is at least one pixel corresponding to a backlight unit at a center of backlight units corresponding to the N-th backlight data subset arranged in an array.

In some embodiments, in the N-th sliding window period, the data processing method further includes: determining a compensation pixel value of the at least one pixel according to the compensation coefficient of the at least one pixel corresponding to the N-th backlight data subset and an initial pixel value of the at least one pixel in a frame image.

In some embodiments, first backlight values of backlight units corresponding to the frame image are calculated according to initial pixel values of pixels of a previous frame image of the frame image. The first backlight values of the backlight units corresponding to the frame image are configured to drive the backlight module to cause the display panel to display the frame image.

In some embodiments, calculating the compensation coefficient of the at least one pixel, in the pixels corresponding to the M-th row of backlight units, that corresponds to the N-th backlight data subset according to the N-th backlight data subset includes: obtaining the compensation coefficient of the at least one pixel according to a formula $$G = \left(\frac{B_{max}}{B_{psf}}\right)^{\frac{1}{\gamma}}.$$

G is a compensation coefficient of a pixel, $\gamma$ is a gamma value of a gamma correction, $B_{max}$ is a maximum first backlight value of a backlight unit corresponding to the pixel, and $B_{psf}$ is a second backlight value corresponding to the pixel. The second backlight value corresponding to the pixel is determined according to a formula $$B_{psf} = \sum_{q=1}^{n}(BL_q \times \Delta_q),$$

wherein $BL_q$ is a first backlight value of a q-th backlight unit of backlight units arranged in an array corresponding to the N-th backlight data subset, $\Delta_q$ is an optical diffusion coefficient of the q-th backlight unit, and n is a number of the backlight units arranged in an array corresponding to the N-th backlight data subset.

In another aspect, a data processing apparatus is provided. The data processing apparatus is applied to a display apparatus. The display apparatus includes a display panel and a backlight module, and has a first storage space and a second storage space. The display panel and the backlight module are disposed opposite to each other. The display panel includes a plurality of pixels. The backlight module includes a plurality of backlight units, and each backlight unit corresponds to a positon of one or more pixels.

The data processing apparatus is configured to: in an (N−1)-th sliding window period, sample the backlight data set by using a sliding window, and store an N-th backlight data subset obtained through sampling in the first storage space; and in an N-th sliding window period, sample the backlight data set by using the sliding window after moving, store an (N+1)-th backlight data subset obtained through sampling in the second storage space, and calculate a compensation coefficient of at least one pixel, in pixels corresponding to the M-th row of backlight units, that corresponds to the N-th backlight data subset according to the N-th backlight data subset. The backlight data set includes first backlight values of at least one row of backlight units, and the at least one row of backlight units includes an M-th row of backlight units. M is a positive integer, and (N−1) is a positive integer.

In some embodiments, the data processing apparatus is further configured to: in an (N+1)-th sliding window period, sample the backlight data set by using the sliding window after moving, store an (N+2)-th backlight data subset obtained through sampling in the first storage space, and calculate a compensation coefficient of at least one pixel, in the pixels corresponding to the M-th row of backlight units, that corresponds to the (N+1)-th backlight data subset according to the (N+1)-th backlight data subset.

In some embodiments, the data processing apparatus is further configured to: in a last sliding window period, calculate a compensation coefficient of at least one pixel, in the pixels corresponding to the M-th row of backlight units, that corresponds to a last backlight data subset according to the last backlight data subset of the backlight data set, and sample a next backlight data set of the backlight data set by using the sliding window after moving to obtain a first backlight data subset of the next backlight data set.

In some embodiments, the data processing apparatus is further configured to: in the N-th sliding window period, calculate a compensation pixel value of the at least one pixel according to the compensation coefficient of the at least one pixel corresponding to the N-th backlight data subset and an initial pixel value of the at least one pixel in a frame image.

In yet another aspect, a data processing apparatus is provided. The data processing apparatus is applied to a display apparatus. The data processing apparatus includes a memory and a processor. The memory has stored therein one or more computer programs. The processor is coupled to the memory. The processor is configured to execute the one or more computer programs to cause the display apparatus to implement the data processing method described in any of the above embodiments.

In yet another aspect, a data processing apparatus is provided. The data processing apparatus is a chip. The chip is configured to implement the data processing method as described in any of the above embodiments.

In yet another aspect, a display apparatus having a first storage space and a second storage space is provided. The display apparatus includes a display panel, a backlight module, and a data processing apparatus. The data processing apparatus is the data processing apparatus described in any of the above embodiments. The display panel includes a plurality of pixels. The backlight module and the display panel are disposed opposite to each other. The backlight module includes a plurality of backlight units, and each backlight unit corresponds to a position of at least one pixel.

In some embodiments, the first storage space and the second storage space are located in at least one buffer of the display apparatus.

In yet another aspect, a non-transitory computer-readable storage medium is provided. The computer-readable storage medium has stored computer program instructions. The computer program instructions, when executed by a computer, cause the computer to perform the data processing method as described in any of the above embodiments.

In yet another aspect, a computer program product is provided. The computer program product includes computer program instructions. When executed by a computer, the computer program instructions causes the computer to perform the data processing method as described in any of the above embodiments.

In yet another aspect, a computer program is provided. When executed on a computer, the computer program causes the computer to perform the data processing method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIG. 13 is a process diagram of yet another data processing method, in accordance with some embodiments.

DETAILED DESCRIPTION

Figure 1:
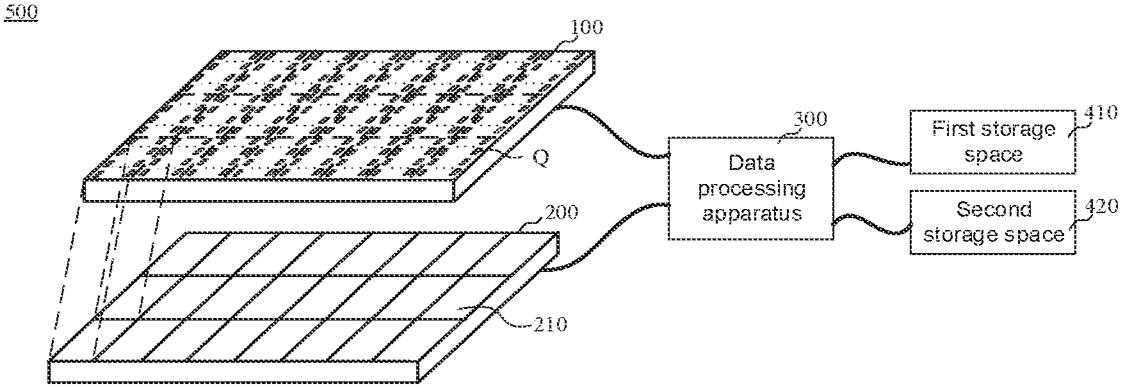
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, the terms such as "coupled" and "connected" and derivatives thereof may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

Terms such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Embodiments of the present disclosure provide a display apparatus. For example, the display apparatus may be a display, or a product including the display, such as a television, a computer (an all-in-one machine or a desktop), a tablet computer, a mobile phone, or an electronic picture screen. For example, the display apparatus may have a high resolution. For example, the display apparatus may be a display apparatus with a resolution of 8K to display images with a resolution of 8K.

As shown in FIG. 1, the display apparatus 500 includes a display panel 100, a backlight module 200, a data processing apparatus 300, a first storage space 410, and a second storage space 420.

As shown in FIG. 1, the display panel 100 includes a plurality of pixels Q. For example, a resolution of the display panel 100 is 7680×4320. The backlight module 200 includes a plurality of backlight units (i.e., backlight partitions) 210. For example, the number of the plurality of backlight units is approximately 20,000. The plurality of pixels Q may be a part or all of pixels Q included in the display panel 100. The plurality of backlight units 210 may be a part or all of backlight units 210 included in the backlight module 200.

Figure 4:
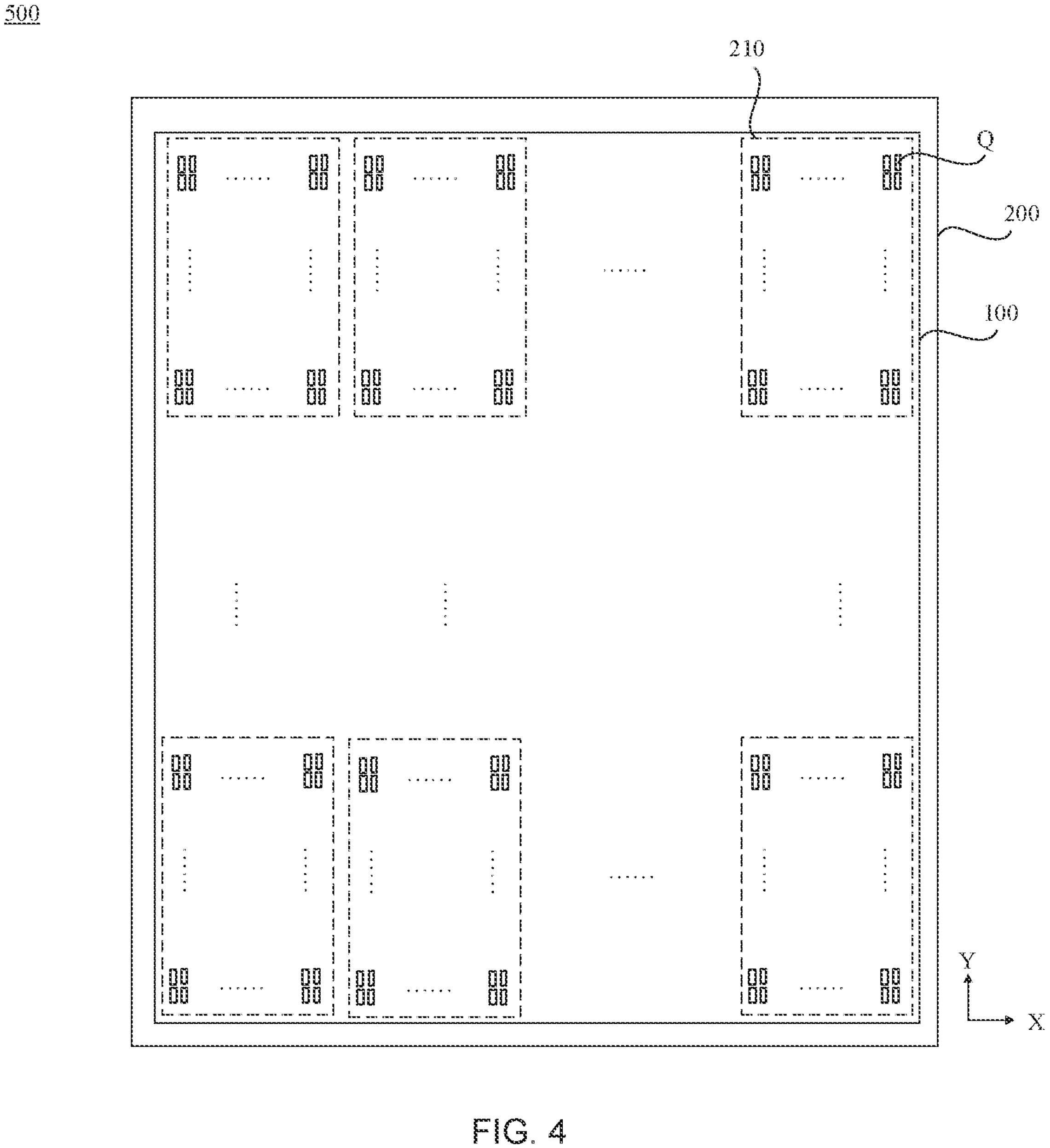
FIG. 4 is a structural diagram of yet another display apparatus, in accordance with some embodiments.

It will be noted that an arrangement of the plurality of pixels Q in the display panel 100 is not limited in the present disclosure. For example, as shown in FIG. 4, the plurality of pixels Q may be arranged in an array. In this case, pixels arranged in a line in an X direction are referred to as a row of pixels, and pixels arranged in a line in a Y direction are referred to as a column of pixels.

In addition, an arrangement of the plurality of backlight units 210 in the backlight module 200 is not limited. For example, the plurality of backlight units 210 are arranged in an array. For example, backlight units arranged in a line in the X direction in FIG. 4 are a row of backlight units, and the X direction is a row direction in which the backlight units are arranged; backlight units arranged in a line in the Y direction in FIG. 4 are a column of backlight units, and the Y direction is a column direction in which the backlight units are arranged.

Each backlight unit corresponds to a position of at least one pixel. For example, each backlight unit corresponds to a position of pixels. In a case where the pixels are arranged in the array, in the pixels corresponding to each backlight unit, the number of pixels in each row is the same as the number of pixels in each column. For example, the pixels corresponding to each backlight unit are arranged in an array of 40 rows and 40 columns.

Figure 2:
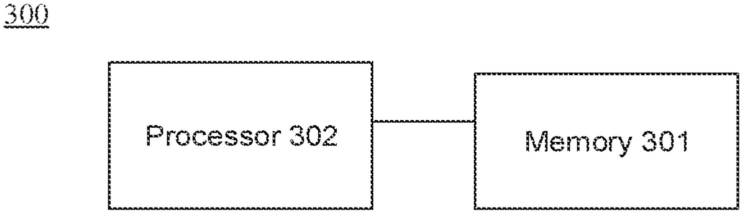
FIG. 2 is a structural diagram of a data processing apparatus, in accordance with some embodiments.

In some embodiments, as shown in FIG. 2, the data processing apparatus 300 includes a memory 301 and a processor 302. The memory 301 is coupled to the processor 302.

The memory 301 has stored therein at least one computer programs that may be executed by the processor 302.

The processor 302 executes the computer program to cause the data processing apparatus 500 to implement a data processing method as described in any of the following embodiments.

For example, the processor 302 may be a single processor, or may be a collective name of a plurality of processing elements. For example, the processor 302 may be a general-purpose central processing unit (CPU), a microprocessor, an application specific integrated circuit (ASIC), or one or more integrated circuits for controlling execution of programs of the solutions of the embodiments of the present disclosure, such as one or more microprocessors.

The memory 301 may be a single memory, or a collective name of a plurality of storage elements, and is used to store executable program codes or the like. Moreover, the memory 301 may be a random access memory (RAM) or a non-volatile memory, such as a disk memory or a flash memory.

The memory 301 is used to store application program codes for executing the solutions of the embodiments of the present disclosure, and the execution is controlled by the processor 302. The processor 302 is used to execute the application program codes stored in the memory 301, so as to control the display apparatus 500 to implement a data processing method provided in any of the following embodiments of the present disclosure.

In some other embodiments, the data processing apparatus 300 may be a chip. The chip is configured to implement a data processing method provided in any of the following embodiments.

For example, the chip may be a programmable device. For example, the programmable device may be a complex programmable logic device (CPLD), an erasable programmable logic device (EPLD), or a field programmable gate array (FPGA).

Figure 3:
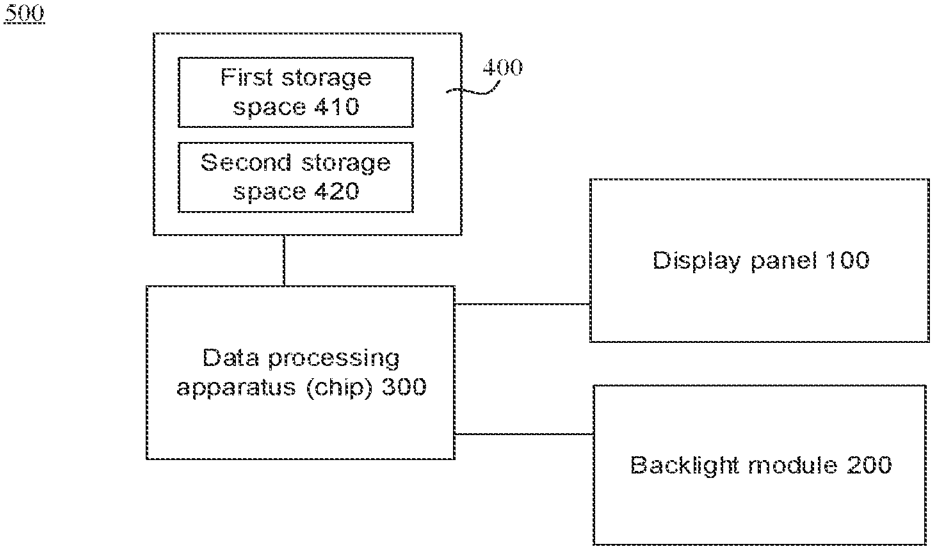
FIG. 3 is a structural diagram of another display apparatus, in accordance with some embodiments.

In some embodiments, the first storage space and the second storage space are located in at least one buffer. For example, the first storage space and the second storage space are located in a same buffer (referring to a buffer 400 in FIG. 3, and the buffer 400 includes the first storage space 410 and the second storage space 420), that is, the first storage space and the second storage space are different storage spaces in the same buffer. Alternatively, for example, the first storage space and the second storage space are located in two buffers, respectively, that is, the first storage space is located in one of the two buffers, and the second storage space is located in the other of the two buffers.

For example, the buffer may be a random access memory or a double data rate synchronous dynamic random access memory (DDR SRAM).

The display apparatus further includes a driver integrated circuit (IC) and a timing controller (T-CON). The driver IC is bonded to the display panel, and the driver IC is coupled to the T-CON. In this case, the data processing apparatus transmits image data (for example, the image data includes pixel values of the pixels; for example, the pixel values are compensation pixel values) to the T-CON. The T-CON outputs timing control signals to the driver IC, and the driver IC outputs driving signals to the display panel according to the timing control signals, so as to drive the display panel to perform the display.

The backlight module further includes a lamp panel on which a plurality of light-emitting devices and a backlight control circuit coupled to the plurality of light-emitting devices are disposed. In this case, the data processing apparatus transmits first backlight values of the backlight units to the backlight control circuit, and the backlight control circuit converts the first backlight values into corresponding backlight control signals (e.g., pulse-width modulation (PWM) signals), and transmits the corresponding backlight control signals to the light-emitting devices in the backlight units, so as to control the light-emitting devices to emit light.

The backlight module adopts a local dynamic dimming technology.

It will be noted that, the number of light-emitting devices provided in a backlight unit is not limited in the embodiments of the present disclosure, and may be designed according to actual situations. For example, the number of the light-emitting devices provided in the backlight unit is greater than or equal to two (for example, in the backlight unit 210 in FIG. 5, there are four light-emitting devices, which are respectively represented by L1 to L4), and at least two light-emitting devices are uniformly distributed in the backlight unit. For example, the light-emitting devices may be inorganic light-emitting devices including micro LEDs or mini LEDs.

Embodiments of the present disclosure provide a data processing method applied to the above display apparatus. An execution subject of the data processing method may be the display apparatus, or may be one or some components in the display apparatus, such as the data processing apparatus.

The display apparatus (or the data processing apparatus) may obtain the first backlight values corresponding to the plurality of backlight units according to image data corresponding to an image to be displayed. The image data includes initial pixel values of the plurality of pixels. For example, according to initial pixel values of pixels corresponding to each backlight unit, first backlight values corresponding to the backlight unit is obtained. For example, the display apparatus further includes a storage component. For example, the storage component may be a memory, such as the DDR SRAM. The storage component is configured to store the first backlight values and the initial pixel values. For example, the first backlight values and the initial pixel values are located in different storage spaces.

It will be understood that, each pixel includes sub-pixels. For example, the sub-pixels are a red sub-pixel, a green sub-pixel and a blue sub-pixel. For example, first image data includes grayscales of sub-pixels in the pixels. For example, an initial pixel value of a pixel may be obtained according to grayscales of sub-pixels in the pixel. For example, RGB data is converted into YUV data according to a grayscale R of the red sub-pixel, a grayscale G of the green sub-pixel, and a grayscale B of the blue sub-pixel in the pixel. The Recommendation ITU-R BT709 standard is taken as an example, a brightness Y of the pixel may be obtained, i.e., $Y=0.2126R+0.7152G+0.0722B$. In this case, the brightness Y of the pixel may be regarded as the initial pixel value of the pixel. A conversion standard of the RGB data and the YUV data is not limited in the embodiments of the present disclosure, which may be selected according to actual situations.

For example, an average pixel value of J times a backlight unit is calculated to obtain the first backlight value of the backlight unit. The average pixel value of the backlight unit is an average value of the initial pixel values of the pixels corresponding to the backlight unit, and J is greater than or equal to 1 and is less than or equal to 2 ($1 \le J \le 2$). For example, J may be 1.5. For example, in a case where each backlight unit corresponds to 1600 pixels, and the 1600 pixels are arranged in an array of 40 rows and 40 columns, an average value of a sum of initial pixel values of J times the 1600 pixels is calculated to obtain the first backlight value of the backlight unit.

It will be noted that the first backlight value of the backlight unit may be a unitless value, and a magnitude of the value represents only a magnitude of a relative brightness of the backlight unit. The first backlight value of the backlight unit may be used to control a magnitude of the driving current. That is, the first backlight value may be regarded as a backlight driving value. A relationship between the backlight driving value and the driving circuit is linear, a relationship between the driving current and a luminous brightness is approximately linear, and the magnitude of the driving current represents the magnitude of the relative brightness of the backlight unit. For example, the chip (i.e., the data processing apparatus) in the display apparatus may convert the backlight driving value into the driving current according to formulas: $I_{OUT,ICG}=I_{OUT,GCG}\times(\text{Code}/127)$, $I_{OUT,GCG}=(1/\text{REXT})\times0.600\times\text{Gain1}\times\text{Gain2}$, Gain1=GCG[A:9], and Gain2=((GCG[8:6])/6.944+1), where REXT is an external resistance of the chip, GCG[A:9] and GCG[8:6]) are both preset register values, Code is the backlight driving value, and $I_{OUT,ICG}$ is the driving current. Of course, different standards for conversion may also be adopted in the present disclosure, which is not limited here. In addition, the first backlight value of the backlight unit may be an actual brightness of the backlight unit. For example, a relationship between the first backlight value (the backlight driving value) $BL_V$ of the backlight unit under a certain brightness (e.g., Y is a certain grayscale P) and a backlight driving value $BL_{V\_MAX}$ of the backlight unit when the luminous brightness of the display apparatus is maximum (for example, Y is a maximum grayscale 255) is: $BL_V=(P/255)\times BL_{V\_MAX}$. The backlight driving value when the luminous brightness of the display apparatus 500 is maximum may be a backlight driving value corresponding to a case where the luminous brightness of the display apparatus 500 obtained when the maximum value of Y is 255 and the luminous brightness of each backlight unit is adjusted reaches the maximum brightness (e.g., 1000 nit).

In this case, the first backlight values of the plurality of backlight units may be divided into a plurality of backlight data sets. In a case where the backlight units are arranged in an array, a backlight data set includes first backlight values of at least one row of backlight units. For example, a backlight data set includes first backlight values of a plurality of rows of backlight units. For example, a backlight data set and a next backlight data set of the backlight data set may have first backlight values of a same number of rows of backlight units.

For a backlight data set, the backlight data set includes first backlight values of at least one row of backlight units, the at least one row of backlight units include an M-th row of backlight units, and M is a positive integer. The M-th row of backlight units is any row of backlight units among the plurality of backlight units.

Figure 6:
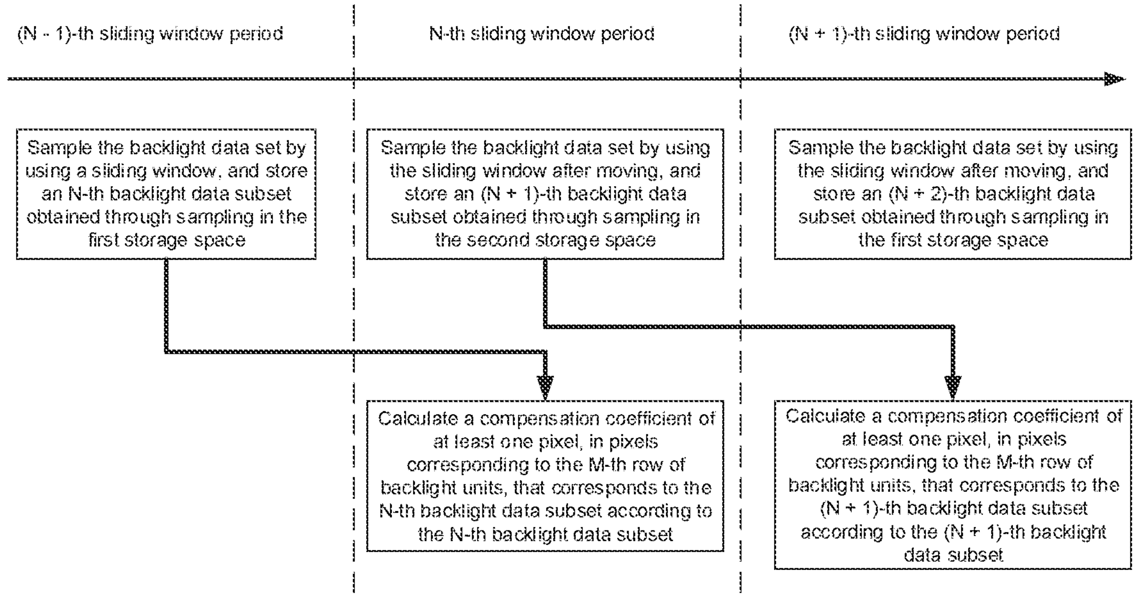
FIG. 6 is a process diagram of a data processing method, in accordance with some embodiments.

Referring to FIG. 6, the data processing method includes the followings.

In an (N−1)-th sliding window period, a sliding window is used to sample a backlight data set, and an N-th backlight data subset obtained through sampling is stored in the first storage space. N−1 is a positive integer, that is, N is an integer greater than 1.

In an N-th sliding window period, the sliding window after moving is used to sample the backlight data set, and an (N+1)-th backlight data subset obtained through a sampling is stored in the second storage space. Then, a compensation coefficient of at least one pixel, in pixels corresponding to the M-th row of backlight units, that corresponds to the N-th backlight data subset is calculated according to the N-th backlight data subset.

In the (N−1)-th sliding window period, the sliding window corresponds to the N-th backlight data subset, the N-th backlight data subset corresponds to a first backlight value of at least one backlight unit, and the at least one backlight unit includes at least one backlight unit of the M-th row of backlight units. For example, in a case where the at least one backlight unit corresponding to the N-th backlight data subset includes backlight units, and the backlight units are arranged in an array, a backlight unit at a center of the array formed by the backlight units is located in the M-th row.

It will be understood that, a period in which the N-th backlight data subset is obtained through sampling is different from a period in which the compensation coefficient of the at least one pixel corresponding to the N-th backlight data subset is calculated according to the N-th backlight data subset, and the two periods are staggered.

In the (N−1)-th sliding window period, the sliding window corresponds to the N-th backlight data subset. For example, a position of the sliding window is located at a position of the N-th backlight data subset, and in this case, the sliding window is used for sampling to obtain the N-th backlight data subset in the (N−1)-th sliding window period. In the N-th sliding window period, the sliding window corresponds to the (N+1)-th backlight data subset. For example, a position of the sliding window is located at a position of the (N+1)-th backlight data subset, and in this case, the sliding window is used for sampling to obtain the (N+1)-th backlight data subset in the N-th sliding window period.

For example, the at least one pixel corresponding to the N-th backlight data subset is at least one pixel corresponding to a backlight unit at a center of backlight units corresponding to the N-th backlight data subset arranged in an array.

Figure 7:
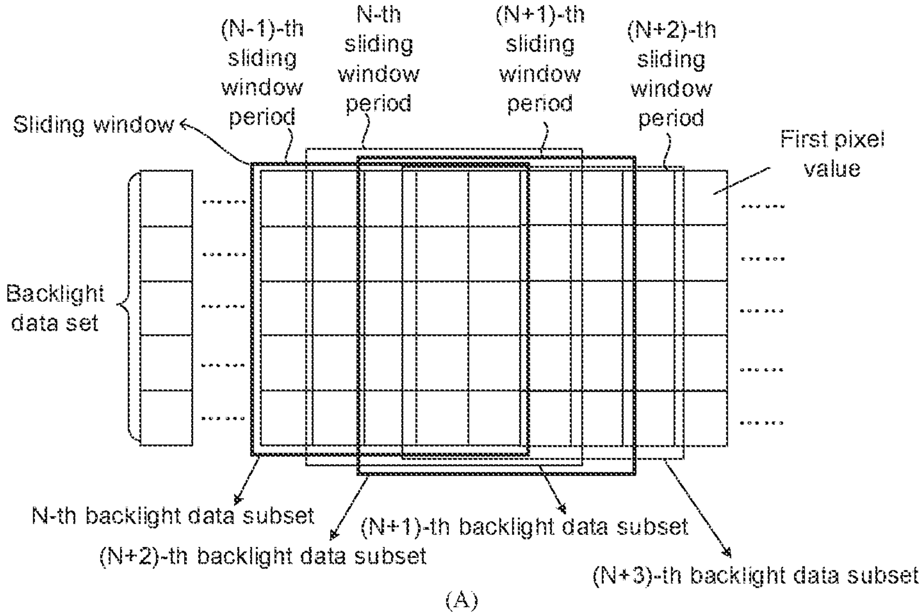
FIG. 7 is a process diagram of another data processing method, in accordance with some embodiments.
Figure 7:
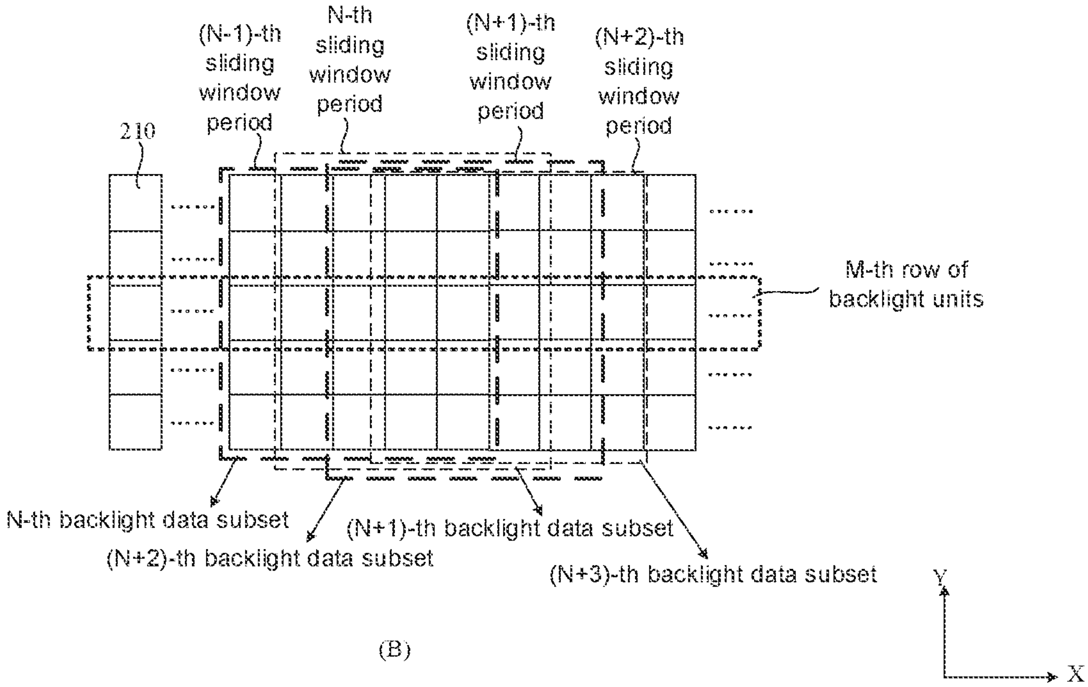

For example, in the (N−1)-th sliding window period, the N-th backlight data subset is obtained through sampling by the sliding window. In the N-th sliding window period, the compensation coefficient of the at least one pixel is calculated; the backlight unit corresponding to a position of the at least one pixel is located at the center of the array of the backlight units corresponding to the N-th backlight data subset, and the backlight unit is located in the M-th row. For example, part (A) in FIG. 7 shows, for a backlight data set, backlight data subsets obtained through the sliding window after moving during sliding window periods: part (B) in FIG. 7 shows backlight units 210 corresponding to the backlight data set in part (A). The backlight units corresponding to the N-th backlight data subset are arranged in an array of 5 rows and 5 columns, and the at least one pixel corresponding to the N-th backlight data subset is at least one pixel corresponding to a backlight unit 210 at a center of the array of 5 rows and 5 columns (i.e., a backlight unit in a third row and a third column in the array of 5 rows and 5 columns). In this way, in the N-th sliding window period, a compensation coefficient of the at least one pixel corresponding to the backlight unit in the third row and the third column in the array of 5 rows and 5 columns corresponding to the N-th backlight data subset is calculated.

For example, in a case where a backlight unit corresponds to pixels, the pixels are arranged in an array. In the N-th sliding window period, compensation coefficients of a row of pixels in the pixels corresponding to a backlight unit may be calculated; the backlight unit is located at a center of the array of the backlight units corresponding to the N-th backlight data subset, and the backlight unit is located in the M-th row. For example, for the backlight unit in the third row and the third column in the array of 5 rows and 5 columns corresponding to the N-th backlight data subset, the backlight unit in the third row and the third column corresponds to 40 rows and 40 columns of pixels. In the N-th sliding window period, compensation coefficients of a row of pixels (i.e., a row of pixels with 40 columns) corresponding to the backlight unit in the third row and the third column may be calculated.

For example, in the N-th sliding window period, compensation coefficients of a row of pixels corresponding to one backlight unit are calculated. In the (N+1)-th sliding window period, compensation coefficients of a row of pixels corresponding to another backlight unit are calculated. The backlight unit and the another backlight unit are two adjacent columns of backlight units in a same row. In addition, the row of pixels corresponding to the backlight unit and the row of pixels corresponding to the another backlight unit are pixels that are continuously arranged in the same row.

For example, in a process in which a compensation coefficient of each pixel is calculated, in a sliding window period in which a compensation coefficient of a pixel in the last column in a row of pixels is calculated, a backlight data subset corresponding to a first backlight value of a backlight unit corresponding to a position of a pixel in a first column in a next row of pixels of the row of pixels is sampled, so that in a next sliding window period, a compensation coefficient of the pixel in the first column in the next row of pixels of the row of pixels is calculated according to the backlight data subset. For example, in a case where a position of a plurality of rows of pixels corresponds to a backlight unit, a backlight data subset corresponding to a first backlight value of a backlight unit corresponding to a position of a pixel in a first column in a row of pixels, in the plurality of rows of pixels, is the same as a backlight data subset corresponding to a first backlight value of a backlight unit corresponding to a position of a pixel in a first column in a next row of pixels of the row of pixels.

For example, in a case where the display panel includes 4320 rows and 7680 columns of pixels, and a backlight unit corresponds to 40 rows and 40 columns of pixels, all the backlight units included in the backlight module 200 are arranged in an array of 108 rows and 192 columns. For the M-th row of backlight units corresponding to a backlight data set, in a 191st sliding window period, a 192nd backlight data subset corresponding to the M-th row of backlight units is obtained through sampling. The 192nd backlight data subset includes first backlight values of a plurality of backlight units, and the plurality of backlight units are arranged in an array centered on the 192nd backlight unit of the M-th row of backlight units. In a 192nd sliding window period, a 193rd backlight data subset corresponding to the M-th row of backlight units is obtained through sampling. The 193rd backlight data subset includes first backlight values of a plurality of backlight units, and the plurality of backlight units are arranged in an array centered on a first backlight unit of the M-th row of backlight units. In addition, compensation coefficients of a first row of pixels in a plurality of rows of pixels corresponding to the 192nd backlight unit are calculated according to the 192nd backlight data subset obtained through sampling in the 191st sliding window period. In a 193rd sliding window period, a 194th backlight data subset corresponding to the M-th row of backlight units is obtained through sampling. The 194th backlight data subset includes first backlight values of a plurality of backlight units, and the plurality of backlight units are arranged in an array centered on a second backlight unit of the M-th row of backlight units. In addition, compensation coefficients of a second row of pixels in a plurality of rows of pixels corresponding to the first backlight unit are calculated according to the 193rd backlight data subset obtained through sampling in the 192nd sliding window period. In a 194th sliding window period, a 195th backlight data subset corresponding to the M-th row of backlight units is obtained through sampling. The 195th backlight data subset includes first backlight values of a plurality of backlight units, and the plurality of backlight units are arranged in an array centered on a third backlight unit of the M-th row of backlight units. In addition, compensation coefficients of a third row of pixels in the plurality of rows of pixels corresponding to the second backlight unit are calculated according to the 194th backlight data subset obtained through sampling in the 193rd sliding window period. For example, in a second sliding window period, a third backlight data subset corresponding to the M-th row of backlight units is obtained through sampling. The third backlight data subset includes first backlight values of a plurality of backlight units, and the plurality of backlight units are arranged in an array centered on the third backlight unit of the M-th row of backlight units. The third backlight data subset obtained through sampling in the second sliding window period is the same as the 195th backlight data subset obtained through sampling in the 194th sliding window period.

Figure 8A:
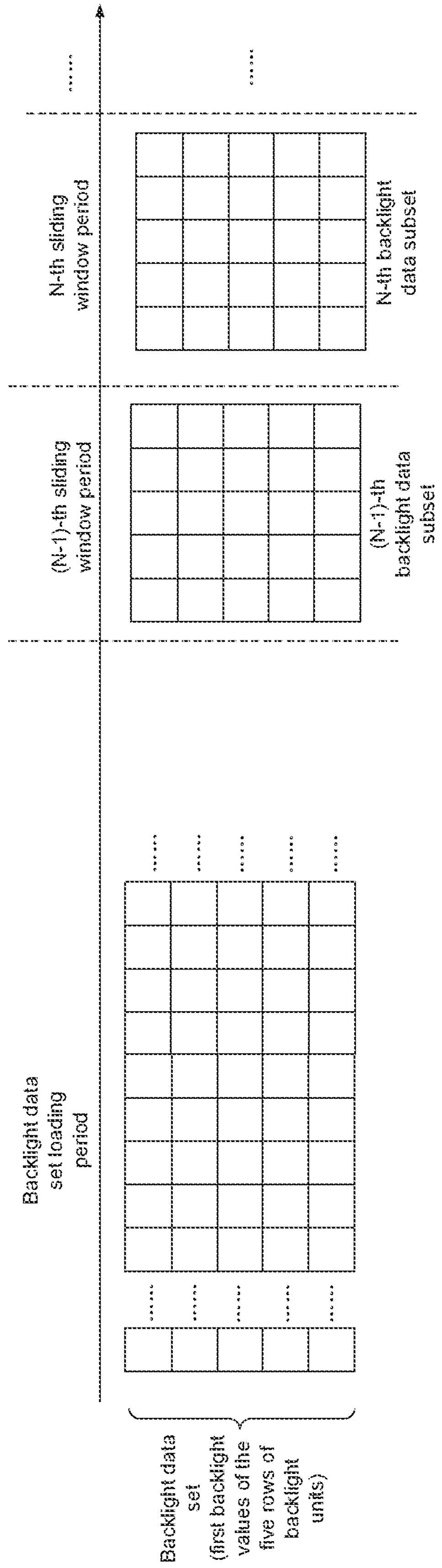
FIG. 8A is a process diagram of a data processing method, in accordance with an example.

In some examples, in a process in which first backlight values of a plurality of backlight units are obtained through sampling, firstly, a backlight data set is taken out from the memory (e.g., a DDR SRAM) that stores first backlight values of all backlight units, and the backlight data set is loaded into a storage space, and the backlight data set includes first backlight values of a plurality of rows of backlight units, and then, the backlight data set composed of the loaded first backlight values of the plurality of rows of backlight units is sampled by using a sliding window, so that backlight data subsets are obtained. For example, in a case where a row of backlight units includes 192 columns of backlight units, and a backlight data set includes first backlight values of 5 rows of backlight units, referring to FIG. 8A, the backlight data set needs to be loaded before the backlight data set is sampled, that is, the first backlight values of the 5 rows of backlight units (i.e., (5×192) backlight units) are loaded, and then, a sliding window is used to sample the backlight data set composed of the first backlight values of the (5×192) backlight units. In this way, in a case where a data amount of the backlight data set is large, additional storage resources may be occupied, and the costs may be increased. In addition, if time for loading a first backlight value of a backlight unit is a clock cycle, time for loading the first backlight values of the 5 rows of backlight units is (5×192) clock cycles. Therefore, in a process in which the sliding window starts sampling to obtain a first backlight data subset, (5×192) clock cycles will be waited, i.e., (5×192) clock cycles are delayed. In addition, for a backlight data set, the backlight data set includes first backlight values of at least one row of backlight units, and the at least one row of backlight units includes a M-th row of backlight units. An N-th backlight data subset is obtained through sampling in an N-th sliding window period, and a compensation coefficient of at least one pixel, in pixels corresponding to the M-th row of backlight units, that corresponds to the N-th backlight data subset is calculated. In this way, in a sliding window period in which the compensation coefficient of the at least one pixel is calculated, the compensation coefficient of the at least one pixel is calculated only after the corresponding backlight data subset is obtained, resulting in relatively long time for data processing.

Figure 8B:
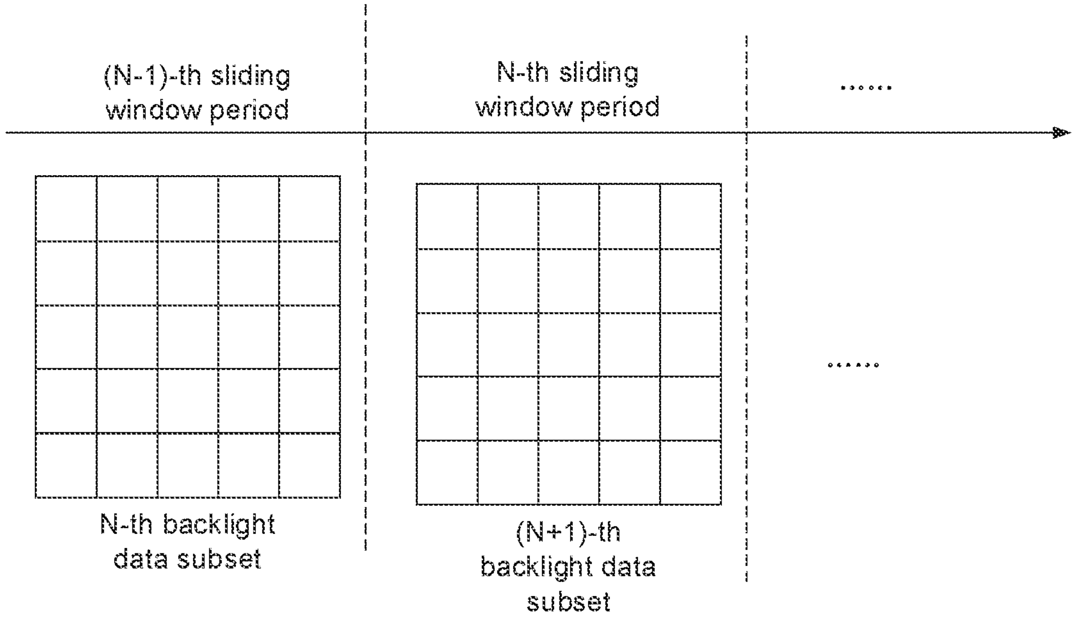
FIG. 8B is yet another process diagram of a data processing method, in accordance with some embodiments.

While in the embodiments of the present disclosure, in a sliding window period, a backlight data subset corresponding to a case where compensation coefficient(s) of pixel(s) is calculated in a next sliding window period may be obtained. In this way, in the next sliding window period, the compensation coefficient(s) of the pixel(s) may be directly calculated according to the obtained backlight data subset, and there is no need to wait for the obtaining of the backlight data subset before calculation. Therefore, a process in which a compensation coefficient of at least one pixel corresponding to a backlight unit is calculated and a process in which a backlight data subset corresponding to a next backlight unit is sampled may be performed synchronously, which saves the time for the data processing, and improves an efficiency of the data processing. In addition, referring to FIG. 8B, in the embodiments of the present disclosure, before a backlight data set is sampled, there is no need to load the backlight data set into an additional storage space, and the backlight data set may be directly sampled in the memory (e.g., the DDR SRAM), which saves the storage resource. In addition, compared with FIG. 8A, in a process in which the backlight data set is sampled, FIG. 8B avoids a delay in the data processing process caused by the loading of the backlight data set, so that the time for the data processing may be shortened, and the efficiency of the data processing may be improved.

Therefore, in the data processing method provided by the embodiments of the present disclosure, in the (N−1)-th sliding window period, the sliding window is used to sample the backlight data set, and the N-th backlight data subset obtained through sampling is stored in the first storage space; in the N-th sliding window period, the sliding window after moving is used to sample the backlight data set, the (N+1)-th backlight data subset obtained through sampling is stored in the second storage space, and the compensation coefficient of the at least one pixel, in the pixels corresponding to the M-th row of backlight units, that corresponds to the N-th backlight data subset is calculated according to the N-th backlight data subset. In this case, in a sliding window period, a backlight data subset corresponding to a case where a compensation coefficient is calculated in a next sliding window period may be obtained. In this way, in the next sliding window period, the compensation coefficient may be directly calculated according to the obtained backlight data subset, and there is no need to wait for the obtaining of the backlight data subset before the calculation. In addition, the process in which the compensation coefficient of the at least one pixel corresponding to a backlight unit and the process in which a backlight data subset corresponding to a next backlight unit is sampled may be performed synchronously, which saves the time for the data processing, and improves the efficiency of the data processing. Moreover, in the embodiments of the present disclosure, there is no need to store the backlight data set through an additional storage space before the backlight data subset is obtained through sampling, so that the time taken for storing the backlight data set may be avoided, and the storage resource is saved.

For example, the at least one row of backlight units corresponding to the backlight data set includes one row of backlight units. In this case, the backlight data set includes the first backlight values of the M-th row of backlight units, and another backlight data set includes first backlight values of an (M+1)-th row of backlight units. The another backlight data set may be a next backlight data set of the backlight data set.

For example, the at least one row of backlight units corresponding to the backlight data set includes two rows of backlight units. For example, the two rows of backlight units include the M-th row of backlight units and the (M+1)-th row of backlight units. In this case, an M-th backlight data set includes the first backlight values of the M-th row of backlight units and the first backlight values of the (M+1)-th row of backlight units, and an (M+1)-th backlight data set includes the first backlight values of the (M+1)-th row of backlight units and first backlight values of an (M+2)-th row of backlight units. For example, in a case where M is equal to 1 (M=1), a first backlight data set includes first backlight values of a first row of backlight units and first backlight values of a second row of backlight units, and a second backlight data set includes the first backlight values of the second row of backlight units and first backlight values of a third row of backlight units.

For example, the at least one row of backlight units corresponding to the backlight data set includes a plurality of rows of backlight units. The plurality of rows of backlight units include at least three rows of backlight units with the M-th row of backlight units as a middle row of backlight units. For example, the number of rows of the at least three rows of backlight units is odd.

The description "at least three rows of backlight units with the M-th row of backlight units as the middle row of backlight units" means that, in the column direction in which the backlight units are arranged, the numbers of rows of backlight units, in the at least three rows of backlight units, that are located at two opposite sides of the M-th row of backlight units are the same, and are each at least one. For example, the number of rows of the at least three rows of backlight units is W, W is an odd number greater than or equal to 3, the M-th row of backlight units is a (W+1)/2 row in the W rows of backlight units, and in the column direction in which the backlight units are arranged, the numbers of rows of backlight units, in the at least three rows of backlight units, that are located at the two opposite sides of the M-th row of backlight units are each (W−1)/2 rows. For example, W is equal to 3 (W=3), the M-th row of backlight units is a middle row of backlight units of the three rows of backlight units. That is, in the column direction in which the backlight units are arranged, the M-th row of backlight units is a second row of backlight units in the three rows of backlight units, and the numbers of rows of backlight units, in the three rows of backlight units, that are located at the two opposite sides of the M-th row of backlight units are each one. For example, W is equal to 5 (W=5), the M-th row of backlight units is a middle row of backlight units in the five rows of backlight units. That is, in the column direction in which the backlight units are arranged, the M-th row of backlight units is a third row of backlight units in the five rows of backlight units, and the numbers of rows of backlight units, in the five rows of backlight units, that are located at the two opposite sides of the M-th row of backlight units are each two.

For example, the at least three rows of backlight units are continuously arranged. For example, in a case where the M-th row of backlight units is a third row of backlight units (i.e., M=3), the at least one row of backlight units includes three rows of backlight units, and the three rows of backlight units include a second row of backlight units, the third row of backlight units, and a fourth row of backlight units. In this case, the M-th backlight data set (i.e., a third backlight data set) includes first backlight values of backlight units from the second row to the fourth row. In a case where the (M+1)-th row of backlight units is the fourth row of backlight units, the at least three rows of backlight units include the third row of backlight units, the fourth row of backlight units, and a fifth row of backlight units. In this case, the (M+1)-th backlight data set (i.e., a fourth backlight data set) includes first backlight values of backlight units from the third row to the fifth row. For example, the at least one row of backlight units includes five rows of backlight units, and in a case where the M-th row of backlight units is the third row of backlight units (i.e., M=3), the five rows of backlight units include a first row of backlight units to the fifth row of backlight units, and the third row of backlight units is a middle row of backlight units from the first row of backlight units to the fifth row of backlight units. In this case, the M-th backlight data set (i.e., the third backlight data set) includes first backlight values of backlight units from the first row to the fifth row. In a case where the (M+1)-th row of backlight units is the fourth row of backlight units, the at least three rows of backlight units include the second row of backlight units to a sixth row of backlight units. In this case, the (M+1)-th backlight data set (i.e., the fourth backlight data set) includes first backlight values of backlight units from the second row to the sixth row.

Figure 9:
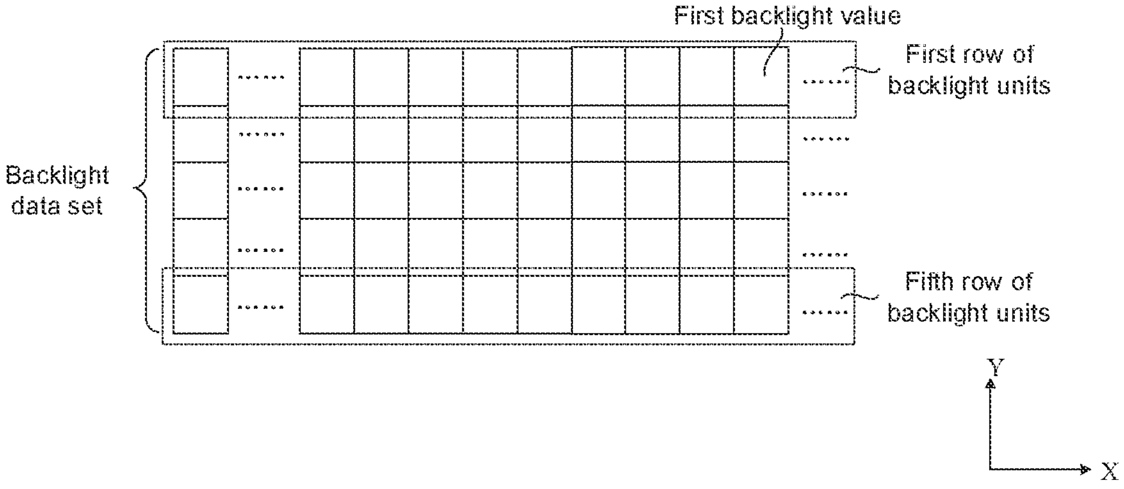
FIG. 9 is a schematic diagram of a backlight data set, in accordance with some embodiments.

For example, in a case where a backlight data set includes first backlight values of at least two rows of backlight units, the first backlight values of the at least two rows of backlight units are sequentially arranged. For example, the first backlight values of the at least two rows of backlight units are sequentially arranged in the column direction in which the plurality of backlight units are arranged. For example, referring to FIG. 9, in a case where the first backlight values of the at least two rows of backlight units include first backlight values of backlight units from the first row to the fifth row, in the Y direction in FIG. 9, first backlight values of the first row of backlight units, first backlight values of the second row of backlight units, first backlight values of the third row of backlight units, first backlight values of the fourth row of backlight units, and first backlight values of the fifth row of backlight units are sequentially arranged. For example, first backlight values of backlight units in each row are arranged in a row direction in which the backlight units are arranged.

For another example, in a case where the M-th row of backlight units is the first row of backlight units, the backlight data set includes virtual backlight values of at least one row, the first backlight values of the first row of backlight units, and the first backlight values of the second row of backlight units that are sequentially arranged in the column direction in which the plurality of backlight units are arranged. The number of virtual backlight values of each row is equal to the number of first backlight values of the first row of backlight units. The virtual backlight values of the at least one row are zero.

Figure 10:
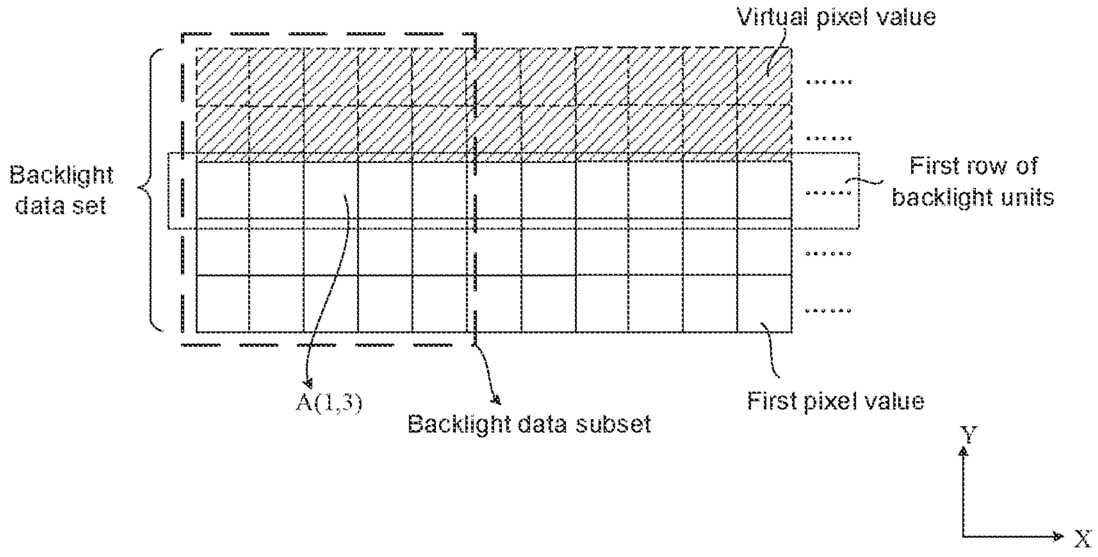
FIG. 10 is a schematic diagram of another backlight data set, in accordance with some embodiments.

It will be understood that, if the first row of backlight units is a center row of backlight units, a previous row of backlight units of the first row of backlight units does not exist, and first backlight values thereof cannot be obtained. In this case, first backlight values corresponding to the previous row of backlight units are each set to zero, so that the number of first backlight values in a backlight data subset obtained through sampling by each sliding window is the same. For example, referring to FIG. 10, in a backlight data subset corresponding to a backlight unit A(1, 3) in a first row and a third column, the backlight unit in the first row and the third column is a center of an array of backlight units of 5 rows and 5 columns corresponding to the backlight data subset, and first two rows of backlight units in the array of the backlight units of the 5 rows and 5 columns do not exist. That is, first backlight values corresponding to the first two rows of backlight units of the array of 5 rows and 5 columns are virtual backlight values, and the virtual backlight values are zero. In this case, the backlight data subset includes virtual backlight values of 2 rows and 5 columns, first backlight values of backlight units from a first column to a fifth column in a first row, first backlight values from a first column to a fifth column in a second row, and first backlight values from a first column to a fifth column in a third row.

For example, in an array composed of backlight units corresponding to first backlight values of a backlight data subset, a backlight unit at a center of the array is located in a first column of the backlight units included in the backlight module. The backlight data subset includes at least one virtual pixel value, for example, positions where the sliding window cannot obtain first backlight values are all virtual pixel values. For example, in an array of 3 rows and 3 columns composed of backlight units corresponding to first backlight values of a backlight data subset, a backlight unit at a center of the array is a backlight unit in a second row and a first column in the backlight module. Thus, nine first backlight values in the backlight data subset are respectively a virtual pixel value, a first backlight value of a backlight unit in a first row and a first column, a first backlight value of a backlight unit in the first row and a second column, a virtual pixel value, a first backlight value of the backlight unit in the second row and the first column, a first backlight value of a backlight unit in the second row and the second column, a virtual pixel value, a first backlight value of a backlight unit in a third row and the first column, and a first backlight value of a backlight unit in the third row and the second column.

For example, that the compensation coefficient of the at least one pixel, in the pixels corresponding to the M-th row of backlight units, that corresponds to the N-th backlight data subset is calculated according to the N-th backlight data subset includes: obtaining the compensation coefficient of the at least one pixel according to a formula $$G = \left(\frac{B_{max}}{B_{psf}}\right)^{\frac{1}{\gamma}}.$$

G is a compensation coefficient of a pixel, $\gamma$ is a gamma value of a gamma correction, $B_{max}$ is a maximum first backlight value of a backlight unit corresponding to the pixel, and $B_{psf}$ is a second backlight value corresponding to the pixel. The second backlight value corresponding to the pixel is a product of the first backlight values in the N-th backlight data subset and optical diffusion coefficients of backlight units corresponding to the N-th backlight data subset at a corresponding position of the pixel.

For example, a backlight driving value corresponding to a maximum luminous brightness value of the display apparatus may be used as a maximum first backlight value (a maximum backlight brightness driving value) of the backlight unit corresponding to a pixel. For example, in a case where a pixel value is the maximum (for example, a pixel grayscale is 255), by adjusting a luminous brightness of each backlight unit, the backlight driving value corresponding to a case where the luminous brightness of the display apparatus reaches the maximum brightness (e.g., 1000 nit) is obtained as the maximum first backlight value of the backlight unit corresponding to the pixel. A relationship between the backlight driving value and the driving current is linear, and a relationship between the driving current and the luminous brightness is approximately linear.

For example, $\gamma$ is a gamma value in a process in which the display apparatus performs the gamma correction on the image data. For example, a value of $\gamma$ may be 2.2 or 2.4.

For example, in a case where the maximum pixel value of the display apparatus is 255, a theoretical physical brightness (a display brightness) output of a pixel based on an initial pixel value of the pixel is B1, i.e., $$B_1 = \left(\frac{V_1}{255}\right)^{\gamma} \times B_{max}.$$

In actual situations, there is a variation of the physical brightness output due to the backlight control in local areas, and the actual physical brightness output B2, i.e., $$B_2 = \left(\frac{V_1}{255}\right)^{\gamma} \times B_{psf},$$

does not meet a theoretical gamma curve. Therefore, in order to ensure that the actual brightness output is equal to the theoretical brightness output, i.e., B1=B2, the actual brightness output is expressed as $$B_2 = \left(\frac{V_1}{255}\right)^{\gamma} \times B_{psf} \times \frac{B_{max}}{B_{psf}}, \text{ i.e., } B_2 = \left[\frac{V_1}{255} \times \left(\frac{B_{max}}{B_{psf}}\right)^{\frac{1}{\gamma}}\right]^{\gamma} \times B_{psf}.$$

In this case, the compensation coefficient of the pixel is obtained, i.e., $$G = \left(\frac{B_{max}}{B_{psf}}\right)^{\frac{1}{\gamma}}.$$

It will be understood that, since the relationship between the backlight value and the driving current is linear, and the relationship between the driving current and the luminous brightness is linear, for convenience of description, $B_{max}$ in the expression may be used as a display brightness corresponding to the maximum first backlight value of the backlight unit corresponding to the pixel, and $B_{psf}$ may be used as a display brightness corresponding to the second backlight value of the pixel.

For example, an optical diffusion coefficient of a backlight unit at a corresponding position of a pixel is related to a relative positional relationship between the backlight unit and the pixel. For example, the relative positional relationship includes a reference distance and a reference angle. For example, referring to FIG. 12, the reference distance Z is a distance between a corresponding position of an orthogonal projection of a pixel Q on the backlight module and a reference point S of the backlight unit 210. The reference point S may be any point in the backlight unit 210, for example, the reference point S is a center point (e.g., a geometric center or a geometric center of gravity) of the backlight unit 210. The reference angle $\theta$ is an included angle between a line connecting the corresponding position of the orthogonal projection of the pixel Q on the backlight module and the reference point S of the backlight unit 210 and a reference direction. The reference direction is any direction in a plane perpendicular to a thickness direction of the display apparatus, for example, the reference direction is the X direction in FIG. 12.

Figure 5:
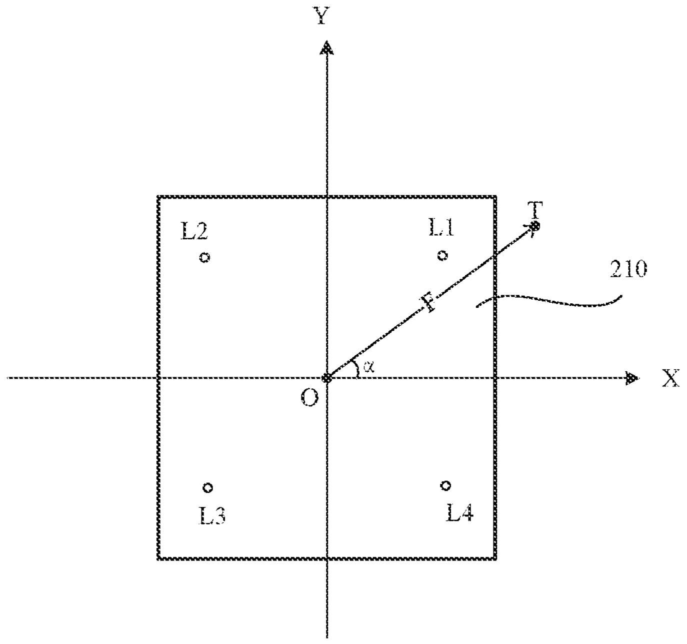
FIG. 5 is a schematic diagram showing obtaining of an optical diffusion coefficient of a backlight unit, in accordance with some embodiments.

For example, in a case where the backlight units are arranged in the array, referring to FIG. 5, a coordinate system is established by taking a center point O of the backlight unit 210 as a coordinate origin, a row direction X of the backlight units 210 as a horizontal axis, and a column direction Y of the backlight units 210 as a vertical axis. A brightness value of each coordinate point T in the coordinate system is measured, a distance F between each coordinate point T and the coordinate origin O is recorded, and an included angle $\alpha$ between a line connecting each coordinate point T and the coordinate origin O and the horizontal axis is recorded; an optical diffusion coefficient of the backlight unit 210 is obtained according to the brightness value of each coordinate point and a brightness value of the coordinate origin. In this way, a corresponding relationship list among the distance F, the included angle $\alpha$, and the optical diffusion coefficient may be obtained. The optical diffusion coefficient may be a ratio of the brightness value of each coordinate point T to the brightness value of the coordinate origin O. For example, the coordinate origin O is a position where the maximum brightness value of the backlight unit 210 is located. In this case, the corresponding relationship list among the distance F, the included angle $\alpha$, and the optical diffusion coefficient may be looked up according to the relative positional relationship, for example, according to the reference distance and the reference angle, so as to obtain the optical diffusion coefficient of the backlight unit under the reference distance and the reference angle.

In this way, a second backlight value corresponding to a pixel may be obtained according to the first backlight values of the N-th backlight data subset and the optical diffusion coefficients of the backlight units corresponding to the N-th backlight data subset at the corresponding position of the pixel. For example, in the array of 5 rows and 5 columns composed of the backlight units corresponding to the N-th backlight data subset, first backlight values of 25 backlight units are $BL_1$ to $BL_{25}$, respectively, a backlight unit corresponding to a pixel is located at a center of the array of 5 rows and 5 columns, and optical diffusion coefficients of the 25 backlight units at the corresponding position of the pixel are $\Delta_1$ to $\Delta_{25}$, respectively. In this case, the second backlight value $B_{psf}$ of the pixel is equal to $(BL_1\times\Delta_1+BL_2\times\Delta_2+BL_3\times\Delta_3+ \ldots +BL_{25}\times\Delta_{25})$ (i.e., $B_{psf}=(BL_1\times\Delta_1+BL_2\times\Delta_2+BL_3\times\Delta_3+ \ldots +BL_{25}\times\Delta_{25})$).

Figure 11A:
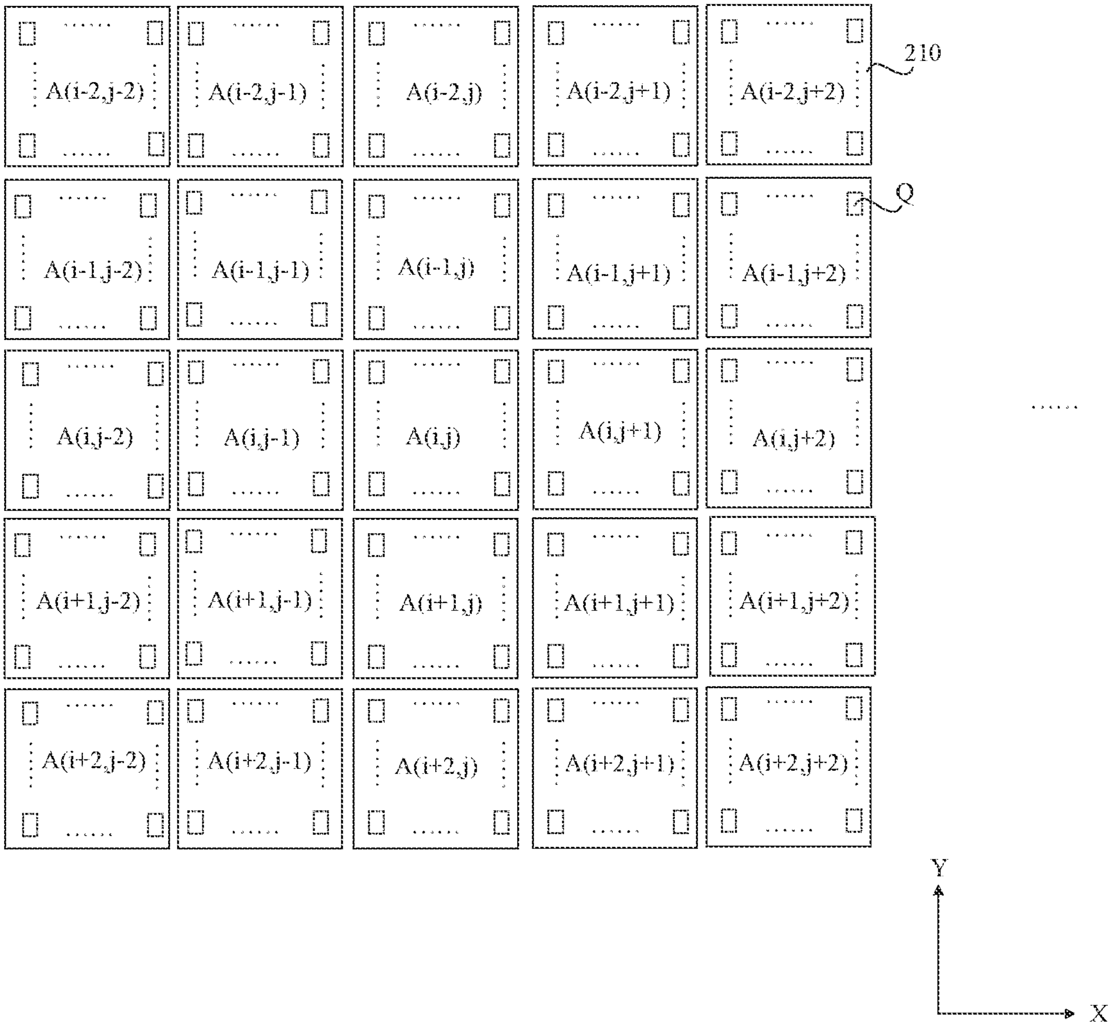
FIG. 11A is a schematic diagram of backlight units corresponding to a backlight data subset, in accordance with some embodiments.
Figures 11B, 12:
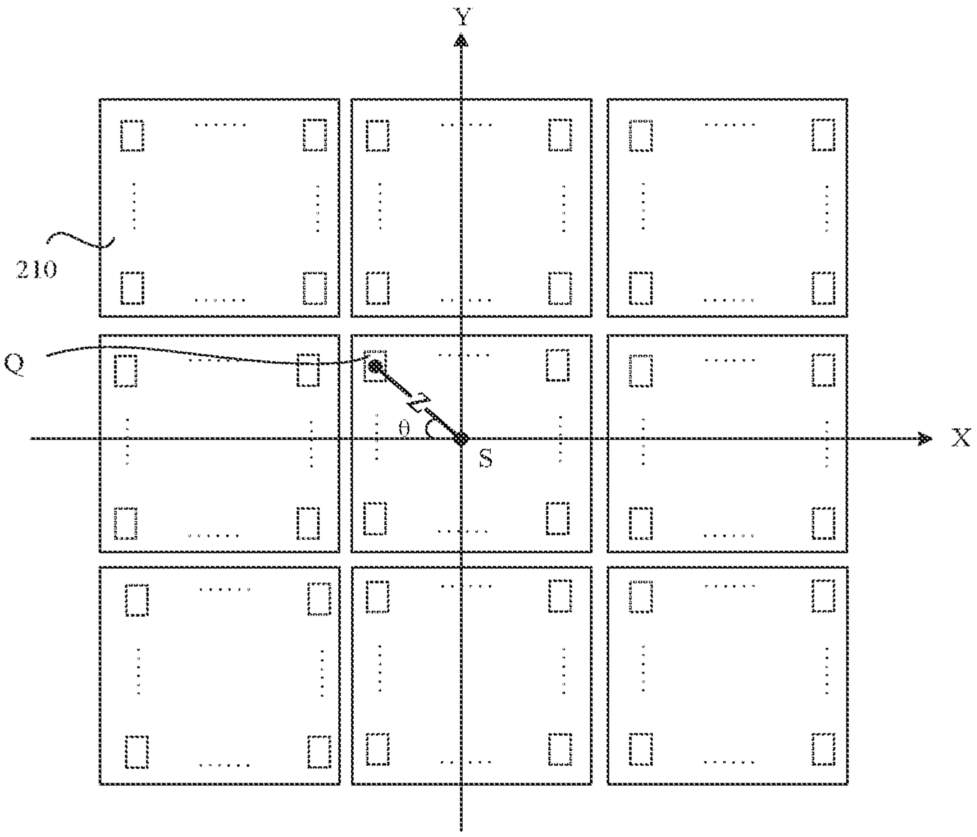
FIG. 11B is a schematic diagram of a backlight data subset, in accordance with some embodiments.
FIG. 12 is a schematic diagram showing determining of a relative positional relationship between pixels and backlight units, in accordance with some embodiments.

For example, a sampling position of a first backlight value of a backlight unit corresponds to the backlight unit. For example, an arrangement position of the first backlight value of the backlight unit A(1, 1) in the first row and the first column is also in the first row and the first column, and the arrangement position may be represented as D(1, 1). Referring to FIGS. 11A and 11B, in a case where the plurality of backlight units corresponding to the backlight data subset are arranged in a backlight unit array of 5 rows and 5 columns, a backlight unit 210 at a center of the backlight unit array of 5 rows and 5 columns is a backlight unit A(i, j) in an i-th row and a j-th column, and a data address of a first backlight value D(i, j) of a backlight unit A(i, j) is p. For example, i and j are both positive integers. For example, in a case where the arrangement position of the first backlight value is a negative number, the first backlight value may be a virtual backlight value. u indicates that a row of backlight units has u columns of backlight units, and u is a positive integer, for example, u is 192.

In this way, a backlight unit in a first row and a first column in the backlight unit array of 5 rows and 5 columns is represented as A(i−2, j−2), an arrangement position of a first backlight value thereof is D(i−2, j−2), and a data address of the first backlight value thereof is (p−2u−2); a backlight unit in the first row and a second column in the backlight unit array of 5 rows and 5 columns is represented as A(i−2, j−1), an arrangement position of a first backlight value thereof is D(i−2, j−1), and a data address of the first backlight value thereof is (p−2u−1); a backlight unit in the first row and a third column in the backlight unit array of 5 rows and 5 columns is represented as A(i−2, j), an arrangement position of a first backlight value thereof is D(i−2, j), and a data address of the first backlight value thereof is (p−2u): a backlight unit in the first row and a fourth column in the backlight unit array of 5 rows and 5 columns is represented as A(i−2, j+1), an arrangement position of a first backlight value thereof is D(i−2, j+1), and a data address of the first backlight value thereof is (p−2u+1); and a backlight unit in the first row and a fifth column in the backlight unit array of 5 rows and 5 columns is represented as A(i−2, j+2), an arrangement position of a first backlight value thereof is D(i−2, j+2), and a data address of the first backlight value thereof is (p−2u+2).

A backlight unit in a second row and the first column in the backlight unit array of 5 rows and 5 columns is represented as A(i−1, j−2), an arrangement position of a first backlight value thereof is D(i−1, j−2), and a data address of the first backlight value thereof is (p−u−2); a backlight unit in the second row and the second column in the backlight unit array of 5 rows and 5 columns is represented as A(i−1, j−1), an arrangement position of a first backlight value thereof is D(i−1, j−1), and a data address of the first backlight value thereof is (p−u−1); a backlight unit in the second row and the third column in the backlight unit array of 5 rows and 5 columns is represented as A(i−1, j), an arrangement position of a first backlight value thereof is D(i−1, j), and a data address of the first backlight value thereof is (p−u); a backlight unit in the second row and the fourth column in the backlight unit array of 5 rows and 5 columns is represented as A(i−1, j+1), an arrangement position of a first backlight value thereof is D(i−1, j+1), and a data address of the first backlight value thereof is (p−u+1); and a backlight unit in the second row and the fifth column in the backlight unit array of 5 rows and 5 columns is represented as A(i−1, j+2), an arrangement position of a first backlight value thereof is D(i−1, j+2), and a data address of the first backlight value thereof is (p−u+2).

A backlight unit in a third row and the first column in the backlight unit array of 5 rows and 5 columns is represented as A(i, j−2), an arrangement position of a first backlight value thereof is D(i, j−2), and a data address of the first backlight value thereof is (p−2); a backlight unit in the third row and the second column in the backlight unit array of 5 rows and 5 columns is represented as A(i, j−1), an arrangement position of a first backlight value thereof is D(i, j−1), and a data address of the first backlight value thereof is (p−1); a backlight unit in the third row and the third column in the backlight unit array of 5 rows and 5 columns is represented as A(i, j), an arrangement position of a first backlight value thereof is D(i, j), and a data address of the first backlight value thereof is p; a backlight unit in the third row and the fourth column in the backlight unit array of 5 rows and 5 columns is represented as A(i, j+1), an arrangement position of a first backlight value thereof is D(i, j+1), and a data address of the first backlight value thereof is (p+1); and a backlight unit in the third row and the fifth column in the backlight unit array of 5 rows and 5 columns is represented as A(i, j+2), an arrangement position of a first backlight value thereof is D(i, j+2), and a data address of the first backlight value thereof is (p+2).

A backlight unit in a fourth row and the first column in the backlight unit array of 5 rows and 5 columns is represented as A(i+1, j−2), an arrangement position of a first backlight value thereof is D(i+1, j−2), and a data address of the first backlight value thereof is (p+u−2); a backlight unit in the fourth row and the second column in the backlight unit array of 5 rows and 5 columns is represented as A(i+1, j−1), an arrangement position of a first backlight value thereof is D(i+1, j−1), and a data address of the first backlight value thereof is (p+u−1); a backlight unit in the fourth row and the third column in the backlight unit array of 5 rows and 5 columns is represented as A(i+1, j), an arrangement position of a first backlight value thereof is D(i+1, j), and a data address of the first backlight value thereof is (p+u); a backlight unit in the fourth row and the fourth column in the backlight unit array of 5 rows and 5 columns is represented as A(i+1, j+1), an arrangement position of a first backlight value thereof is D(i+1, j+1), and a data address of the first backlight value thereof is (p+u+1); and a backlight unit in the fourth row and the fifth column in the backlight unit array of 5 rows and 5 columns is represented as A(i+1, j+2), an arrangement position of a first backlight value thereof is D(i+1, j+2), and a data address of the first backlight value thereof is (p+u+2).

A backlight unit in a fifth row and the first column in the backlight unit array of 5 rows and 5 columns is represented as A(i+2, j−2), an arrangement position of a first backlight value thereof is D(i+2, j−2), and a data address of the first backlight value thereof is (p+2u−2); a backlight unit in the fifth row and the second column in the backlight unit array of 5 rows and 5 columns is represented as A(i+2, j−1), an arrangement position of a first backlight value thereof is D(i+2, j−1), and a data address of the first backlight value thereof is (p+2u−1); a backlight unit in the fifth row and the third column in the backlight unit array of 5 rows and 5 columns is represented as A(i+2, j), an arrangement position of a first backlight value thereof is D (i+2, j), and a data address of the first backlight value thereof is (p+2u); a backlight unit in the fifth row and the fourth column in the backlight unit array of 5 rows and 5 columns is represented as A(i+2, j+1), an arrangement position of a first backlight value thereof is D (i+2, j+1), and a data address of the first backlight value thereof is (p+2u+1); and a backlight unit in the fifth row and the fifth column in the backlight unit array of 5 rows and 5 columns is represented as A(i+2, j+2), an arrangement position of a first backlight value thereof is D (i+2, j+2), and a data address of the first backlight value thereof is (p+2u+2).

In this case, a first backlight value corresponding to the backlight unit A(i, j) may be obtained by changing values of i and j, and a backlight data subset corresponding to the backlight unit A(i, j) may be obtained through sampling accordingly, so that a compensation coefficient of at least one pixel in the backlight unit A(i, j) is calculated.

In some embodiments, in the N-th sliding window period, the data processing method further includes: obtaining a compensation pixel value of the at least one pixel according to the compensation coefficient of the at least one pixel corresponding to the N-th backlight data subset and an initial pixel value of the at least one pixel in a frame image.

For example, a compensation pixel value $V_2$ of the pixel is a product of a compensation coefficient G of the pixel and an initial pixel value $V_1$ of the pixel. For example, the compensation coefficient of the pixel is G, i.e., $$G=\left(\frac{B_{max}}{B_{psf}}\right)^{\frac{1}{\gamma}},$$

the initial pixel value of the pixel is $V_1$, and the compensation pixel value $V_2$ of the pixel is satisfied with $$V_2=V_1\times\left(\frac{B_{max}}{B_{psf}}\right)^{\frac{1}{\gamma}}.$$

For a display apparatus, such as a liquid crystal display apparatus, the backlight module provides a light source for the display panel, and an image viewed by a user is a light extraction effect of a superposition of the light-emitting devices in the backlight module and the pixels in the display panel. Since a liquid crystal layer in the liquid crystal display apparatus has a transmittance to the light emitted by the backlight module, in a case where the display apparatus displays an all-black image, a portion of the backlight will be transmitted, resulting in a light leakage in the display apparatus and a reduction in a display effect. In order to avoid the light leakage, it is possible to reduce the brightness of the backlight while a relatively dark image is displayed. In this way, even if the liquid crystal layer has a certain transmittance, the light passing through the liquid crystal layer may be reduced at a relatively low backlight brightness, so that an all-black display effect is achieved; and in a case of a bright image is displayed, a required backlight brightness may be maintained to realize a display effect of the bright image. For example, the light leakage of the display may be avoided by the local dynamic dimming technology. For example, the backlight module includes the plurality of backlight units (which may also be described as backlight partitions), at least one pixel corresponds to a backlight unit, so that a light-emitting device corresponds to at least one pixel in the display panel, and an intensity of the backlight is dynamically controlled according to a display content (i.e., a magnitude of the pixel value) of the at least one pixel which a position thereof corresponding to the backlight unit. A luminous brightness of the light-emitting device in the backlight unit is controlled by the pixel corresponding to the backlight unit, the luminous brightness of the backlight unit may be reduced in a case of a relatively dark image, while the luminous brightness of the backlight unit is maintained in a case of the bright image.

It will be understood that, a bright portion and a dark portion on the display image are connected to each other. For a display area in the display image, a luminous brightness of a backlight unit corresponding to the display area should be controlled jointly by a corresponding light-emitting device and several light-emitting devices surrounding the light-emitting device. However, since there is a difference in brightness between the backlight unit in the backlight module corresponding to the display area and backlight units surrounding the backlight unit, when the luminous brightness of the light-emitting devices in the backlight units surrounding the backlight unit are significantly reduced, a luminous brightness at the backlight unit may be affected, resulting in a deviation in the display brightness of the display area corresponding to the backlight unit. In this way, for a characteristic curve that measures the brightness and a color perception of human eyes, i.e., a curve that can reflect an actual perception of a displayed image by the human eyes, such as the gamma curve, due to the brightness of the backlight unit corresponding to the dark portion, the gamma curve is significantly distorted in a low pixel value (i.e., a low grayscale) interval, which deviates from a standard gamma curve. Such distortion will make the human eyes unable to see the details of the image when the display apparatus displays the dark portion of the image.

In this case, in a display process of the display apparatus, the backlight module drives the backlight units to emit light according to the first backlight values corresponding to the backlight units, and the display panel performs the display according to the compensation pixel values of the pixels, and compensates for the pixel values of the pixels in combination with the actual backlight brightness, which may avoid the deviation of the display of the pixels caused by a mutual interference of the light emission of the backlight units, and may avoid the distortion of the gamma curve, thereby improving the display effect of the display apparatus.

For example, in a case where the display panel is driven in a row-by-row driving manner, the process of compensation of the pixel values of the plurality of pixels is also performed row by row. For a backlight data set, a moving direction of the sliding window is the same as the row direction of the backlight units, and a moving step of the sliding window is first backlight values corresponding to a column of backlight units. For example, referring to FIG. 7, for a backlight data set, the moving direction of the sliding window is the same as the row direction (i.e., the X direction in FIG. 7) of the backlight units, and compared with the sliding window in the (N−1)-th sliding window period, the sliding window in the N-th sliding window period moves for positions of first backlight values of a column of backlight units.

For example, a time difference between a starting time of calculation of the compensation coefficient of the first pixel according to the N-th backlight data subset in the N-th sliding window period and a starting time of calculation of the compensation coefficient of the first pixel according to the (N+1)-th backlight data subset in the (N+1)-th sliding window period is a pixel period of a row of pixels in the pixels corresponding to a backlight unit. For example, in a case where the number of pixels in a row of pixels in the pixels corresponding to a backlight unit is 40, the time difference between the starting time of calculation of the compensation coefficient of the first pixel according to the N-th backlight data subset in the N-th sliding window period and the starting time of calculation of the compensation coefficient of the first pixel according to the (N+1)-th backlight data subset in the (N+1)-th sliding window period is 40 pixel periods. A pixel period is the time for calculating the compensation coefficient of a pixel according to the backlight data subset.

It will be understood that, in the N-th sliding window period, the (N+1)-th backlight data subset is obtained through sampling during a phase in which compensation coefficients of a row of pixels (e.g., 40 pixels) are calculated according to the N-th backlight data subset. That is, before the (N+1)-th sliding window period, the (N+1)-th backlight data subset is obtained in advance. In this way, the (N+1)-th backlight data subset may be obtained before compensation coefficient(s) of corresponding pixel(s) are calculated in the (N+1)-th sliding window period according to the (N+1)-th backlight data subset. Compared to a case where the (N+1)-th backlight data subset is obtained in the (N+1)-th sliding window period, it is possible to save sampling time of the data, avoid the delay in the data processing, and improve the efficiency of the data processing.

For example, a sampling process of the backlight data subset on which the calculation of the compensation coefficient of a pixel corresponding to the backlight unit is based and a calculation process of the compensation coefficient of the pixel are not in a sliding window period, and the sampling process of the backlight data subset on which the calculation of the compensation coefficient of the pixel corresponding to the backlight unit is based is earlier than the calculation process of the compensation coefficient of the pixel. In this way, when the pixel data (i.e., the initial pixel value) is obtained, the compensation coefficient may be calculated according to the obtained backlight data subset, and the compensation pixel value may be obtained according to the compensation coefficient and the initial pixel value. Compared to a case where the backlight data subset is obtained through sampling when the pixel data is obtained, the pixel data needs to be stored in a storage space first, the pixel is compensated after the backlight data subset is obtained through sampling, and the compensation pixel value is calculated, in the embodiments of the present disclosure, when the pixel data is obtained, calculation may be directly performed based on the backlight data subset, so that the storage space for storing the pixel data may be saved, and occupation of additional storage resources may be avoided.

In some embodiments, referring to FIG. 6, the data processing method further includes: in the (N+1)-th sliding window period, sampling the backlight data set by using a sliding window, storing an (N+2)-th backlight data subset obtained through sampling in the first storage space, and calculating a compensation coefficient of at least one pixel, in the pixels corresponding to the M-th row of backlight units, that corresponds to the (N+1)-th backlight data subset according to the (N+1)-th backlight data subset.

It will be understood that, after the compensation coefficient of the at least one pixel, in the pixels corresponding to the M-th row of backlight units, that corresponds to the N-th backlight data subset is calculated according to the N-th backlight data subset in the N-th sliding window period, the compensation coefficient of the at least one pixel corresponding to the (N+1)-th backlight data subset is calculated. In this case, the N-th backlight data subset stored in the first storage space has been used. In this case, referring to FIG. 13, in a process in which the (N+2)-th backlight data subset is obtained, the (N+2)-th backlight data subset may be stored in the first storage space, and in a process in which an (N+3)-th backlight data subset is obtained, the (N+3)-th backlight data subset may be stored in the second storage space. In this way, the first storage space and the second storage space can store data alternately, which saves the data storage space of the display apparatus and saves production costs.

In some embodiments, the data processing method further includes: in a last sliding window period corresponding to the backlight data set, calculating a compensation coefficient of at least one pixel, in the pixels corresponding to the M-th row of backlight units, that corresponds to a last backlight data subset according to the last backlight data subset of the backlight data set, and sampling a next backlight data set of the backlight data set by using the sliding window after moving to obtain a first backlight data subset of the next backlight data set.

Figure 14:
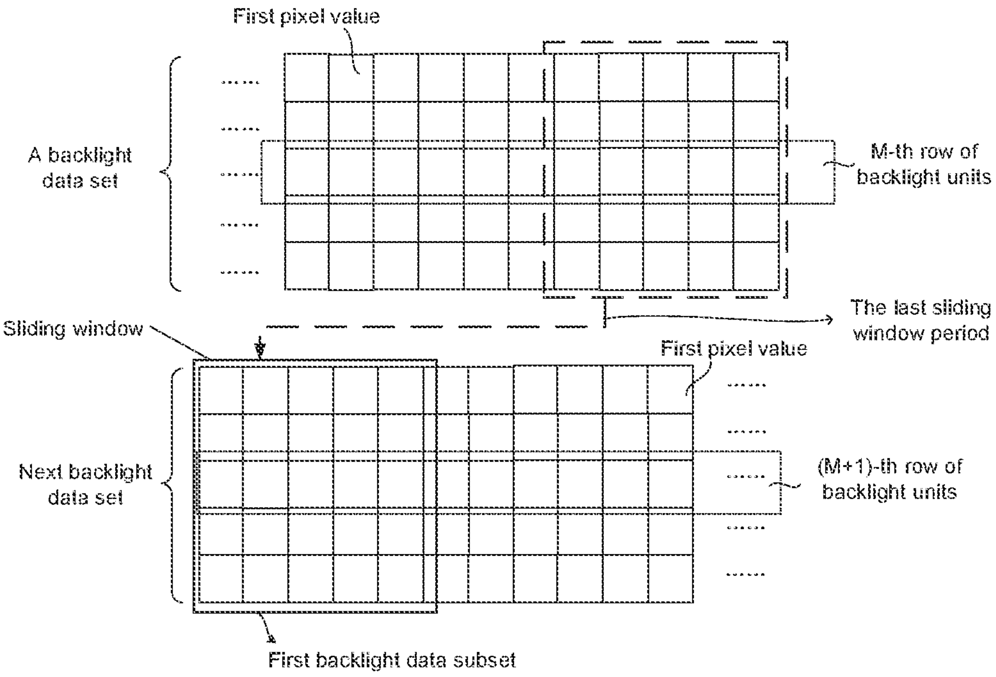
FIG. 14 is a process diagram of yet another data processing method, in accordance with some embodiments.

It will be understood that, referring to FIG. 14, a backlight data set includes first backlight values of the M-th row of backlight units, and the next backlight data set of the backlight data set includes first backlight values of the (M+1)-th row of backlight units. A last backlight data subset of the backlight data set is a backlight data subset, in the backlight data set, that is used to calculate the compensation coefficients of a last row of pixels corresponding to the M-th row of backlight units. A first backlight data subset of the next backlight data set is a backlight data subset, in the next backlight data set, that is used to calculate compensation coefficients of a first row of pixels corresponding to the (M+1)-th row of backlight units.

For example, in the row direction in which the backlight units are arranged, the sliding window moves for positions of a column of backlight units in the row direction each time in the data processing process.

For example, backlight units corresponding to the backlight data subset obtained through sampling by the sliding window are arranged in an array. For example, a backlight unit corresponding to at least one pixel, in the pixels corresponding to the M-th row of backlight units, whose compensation coefficient is calculated is located at a center of the array of the backlight units corresponding to the backlight data subset obtained through sampling by the sliding window. For example, if backlight units corresponding to a backlight data subset obtained through sampling by a sliding window are arranged in an array of 5 rows and 5 columns, a backlight unit corresponding to at least one pixel, in the pixels corresponding to the M-th row of backlight units, whose compensation coefficient is calculated is located at a center of the array of 5 rows and 5 columns, that is, the backlight unit is a backlight unit in the third row and the third column of the array of 5 rows and 5 columns.

In this case, in the last sliding window period corresponding to the backlight data set, the sliding window slides to sample the next backlight data set to obtain the first backlight data subset of the next backlight data set. For example, referring to FIG. 14, the backlight data set includes the first backlight values of rows of backlight units with the M-th row of backlight units as the middle row of backlight units, and the next backlight data set includes first backlight values of rows of backlight units with the (M+1)-th row of backlight units as the middle row of backlight units. In this case, backlight units corresponding to first backlight values in the first backlight data subset includes a first backlight unit (i.e., a backlight unit in a first column) in the (M+1)-th row of backlight units. In addition, in a case where the backlight units corresponding to the first backlight values in the first backlight data subset are arranged in an array, the first backlight unit in the (M+1)-th row of backlight units is located at a center of the array. For example, the sliding window moves from a last backlight unit of a row of backlight units to a first backlight unit of a next row of backlight units, so as to obtain a backlight data subset corresponding to the backlight unit array centered on the first backlight unit through sampling. In this way, the movement of the sliding window between the two backlight data sets may be made continuous, so that continuous data processing may be realized.

In some embodiments, first backlight values of backlight units corresponding to a frame image are calculated according to initial pixel values of pixels of a previous frame image of the frame image. In a case where the display panel displays the frame image, the first backlight values of the backlight units corresponding to the frame image are configured to drive the backlight module.

For example, according to initial pixel values of pixels in image data of a (K−1)-th frame image, first backlight values of backlight units corresponding to the (K−1)-th frame image are calculated. When a K-th frame image is obtained, pixel values of pixels corresponding to the K-th frame image are compensated according to the first backlight values of the backlight units calculated according to the initial pixel values of the pixels corresponding to the (K−1)-th frame image. In this case, first backlight values in a backlight data set corresponding to the K-th frame image are calculated according to the initial pixel values of the pixels corresponding to the (K−1)-th frame image. (K−1) is a positive integer. When the display panel displays the K-th frame image, the first backlight values of the backlight units corresponding to the K-th frame image are configured to drive the backlight module.

It will be understood that, since a time interval between two adjacent frame images is short, first backlight values of the backlight units corresponding to the two adjacent frame images are approximately equal. In this way, in a process in which the image data of a frame image is processed, the backlight data set of the previous frame image may be used, there is no need to calculate first backlight values of backlight units according to image data of the current frame image, so that the time for the data processing is saved, and the efficiency of the data processing is improved.

It will be noted that, first backlight values of backlight data set corresponding to a first frame image may be calculated from initial pixel values of pixels of the first frame image.

The embodiments of the present disclosure provide a data processing apparatus. For example, the data processing apparatus is applied to the above display apparatus.

For an M-th backlight data set, the M-th backlight data set includes first backlight values of at least one row of backlight units. The at least one row of backlight units includes an M-th row of backlight units, and M is a positive integer. The data processing apparatus is configured to: in an (N−1)-th sliding window period, use a sliding window to sample an M-th backlight data set and store an N-th backlight data subset obtained through sampling in a first storage space; and in an N-th sliding window period, use the sliding window after moving to sample the M-th backlight data set, store an (N+1)-th backlight data subset obtained through sampling in a second storage space, and calculate a compensation coefficient of at least one pixel, in pixels corresponding to the M-th row of backlight units, that corresponds to the N-th backlight data subset according to the N-th backlight data subset. (N−1) is a positive integer.

In some embodiments, the data processing apparatus is further configured to: in an (N+1)-th sliding window period, use the sliding window after moving to sample the M-th backlight data set, store an (N+2)-th backlight data subset obtained through sampling in the first storage space, and calculate a compensation coefficient of at least one pixel, in the pixels corresponding to the M-th row of backlight units, that corresponds to the (N+1)-th backlight data subset according to the (N+1)-th backlight data subset.

In some embodiments, the data processing apparatus is further configured to: in a last sliding window period corresponding to the M-th backlight data set, calculate a compensation coefficient of at least one pixel, in the pixels corresponding to the M-th row of backlight units, that corresponds to a last backlight data subset according to the last backlight data subset of the M-th backlight data set, and use the sliding window after moving to sample an (M+1)-th backlight data set to obtain a first backlight data subset of the (M+1)-th backlight data set.

In some embodiments, the data processing apparatus is further configured to: in the N-th sliding window period, obtain a compensation pixel value of the at least one pixel according to the compensation coefficient of the at least one pixel corresponding to the N-th backlight data subset and an initial pixel value of the at least one pixel in a frame image.

It will be noted that, beneficial effects of the data processing apparatus described above are the same as beneficial effects of the data processing method described in some of the above embodiments, which will not be repeated here.

Some embodiments of the present disclosure provide a non-transitory computer-readable storage medium. The non-transitory computer-readable storage medium stores computer program instructions. When the computer program instructions executed by a processor, a computer executes the data processing method as described in any of the above embodiments.

For example, the computer herein may be the above display apparatus.

For example, the non-transitory computer-readable storage media may include, but is not limited to a magnetic storage device (e.g., a hard disk, a floppy disk or a magnetic tape), an optical disk (e.g., a compact disk (CD) or a digital versatile disk (DVD)), a smart card or a flash memory device (e.g., an erasable programmable read-only memory (EPROM), a card, a stick or a key drive). Various computer-readable storage media described in the embodiments of the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed on a computer, cause the computer to perform one or more steps in the data processing method as described in the above embodiments.

Some embodiments of the present disclosure further provide a computer program. When executed on a computer, the computer program causes the computer to perform one or more steps in the data processing method as described in the above embodiments.

The non-transitory computer-readable storage medium, the computer program product and the computer program have same beneficial effects as the data processing method described in some of the above embodiments, which will not be described herein again.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A data processing method applied to a display apparatus, the display apparatus including a display panel, a backlight module and a storage component, and having a first storage space and a second storage space, the display panel and the backlight module being disposed opposite to each other, wherein the display panel includes a plurality of pixels, the backlight module includes a plurality of backlight units, each backlight unit corresponds to a position of one or more pixels, the storage component is configured to store first backlight values of all backlight units; the data processing method comprises:

in an (N−1)-th sliding window period, sampling a backlight data set directly in the storage component by using a sliding window, and storing all first backlight values of an N-th backlight data subset obtained through sampling in the first storage space, wherein the backlight data set includes first backlight values of at least one row of backlight units, the at least one row of backlight units includes an M-th row of backlight units, M is a positive integer, and (N−1) is a positive integer; and in an N-th sliding window period, sampling the backlight data set directly in the storage component by using the sliding window after moving, storing all first backlight values of an (N+1)-th backlight data subset obtained through sampling in the second storage space, and calculating a compensation coefficient of at least one pixel, in pixels corresponding to the M-th row of backlight units, that corresponds to the N-th backlight data subset according to the N-th backlight data subset;

wherein a moving step of the sliding window is first backlight values corresponding to a column of backlight units; and in the N-th sliding window period, the data processing method further comprises:

determining a compensation pixel value of the at least one pixel according to the compensation coefficient of the at least one pixel corresponding to the N-th backlight data subset and an initial pixel value of the at least one pixel in a frame image; wherein first backlight values of backlight units corresponding to the frame image are calculated according to initial pixel values of pixels of a previous frame of the frame image, the first backlight values of the backlight units corresponding to the frame image are configured to drive the backlight module to cause the display panel to display the frame image.

2. The data processing method according to claim 1, further comprising:

in an (N+1)-th sliding window period, sampling the backlight data set directly in the storage component by using the sliding window after moving, storing all first backlight values of an (N+2)-th backlight data subset obtained through sampling in the first storage space, and calculating a compensation coefficient of at least one pixel, in the pixels corresponding to the M-th row of backlight units, that corresponds to the (N+1)-th backlight data subset according to the (N+1)-th backlight data subset.

3. The data processing method according to claim 1, further comprising:

in a last sliding window period, calculating a compensation coefficient of at least one pixel, in the pixels corresponding to the M-th row of backlight units, that corresponds to a last backlight data subset according to the last backlight data subset of the backlight data set, and sampling a next backlight data set of the backlight data set by using the sliding window after moving to obtain a first backlight data subset of the next backlight data set.

4. The data processing method according to claim 1, wherein the at least one row of backlight units includes a plurality of rows of backlight units, and the plurality of rows of backlight units include at least three rows of backlight units with the M-th row of backlight units as a middle row of backlight units.

5. The data processing method according to claim 1, wherein the M-th row of backlight units is a first row of backlight units, the backlight data set includes virtual backlight values of at least one row, first backlight values of the first row of backlight units, and first backlight values of a second row of backlight units that are sequentially arranged; and a number of virtual backlight values of each row is equal to a number of the first backlight values of the first row of backlight units, and the virtual backlight values of the at least one row are zero.

6. The data processing method according to claim 1, wherein the at least one pixel corresponding to the N-th backlight data subset is at least one pixel corresponding to a backlight unit at a center of backlight units corresponding to the N-th backlight data subset arranged in an array.

7. The data processing method according to claim 1, wherein calculating the compensation coefficient of the at least one pixel, in the pixels corresponding to the M-th row of backlight units, that corresponds to the N-th backlight data subset according to the N-th backlight data subset includes:

obtaining the compensation coefficient of the at least one pixel according to a formula $$G=\left(\frac{B_{max}}{B_{psf}}\right)^{\frac{1}{\gamma}},$$

wherein G is a compensation coefficient of a pixel, $\gamma$ is a gamma value of a gamma correction, $B_{max}$ is a maximum first backlight value of a backlight unit corresponding to the pixel, and $B_{psf}$ is a second backlight value corresponding to the pixel; the second backlight value corresponding to the pixel is determined according to a formula $$B_{psf}=\sum_{q=1}^{n}(BL_q\times\Delta_q),$$

wherein $BL_q$ is a first backlight value of a q-th backlight unit of backlight units arranged in an array corresponding to the N-th backlight data subset, $\Delta_q$ is an optical diffusion coefficient of the q-th backlight unit, and n is a number of the backlight units arranged in the array corresponding to the N-th backlight data subset.

8. A data processing apparatus applied to a display apparatus, the data processing apparatus comprising:

a memory having stored therein one or more computer programs; and a processor coupled to the memory, the processor being configured to execute the one or more computer programs to cause the display apparatus to implement the data processing method according to claim 1.

9. A display apparatus having a first storage space and a second storage space, the display apparatus comprising:

a display panel including a plurality of sub-pixels;

a backlight module disposed opposite to the display panel, the backlight module including a plurality of backlight units, each backlight unit corresponding to a position of at least one pixel; and the data processing apparatus according to claim 8.

10. A data processing apparatus, the data processing apparatus being a chip, the chip being configured to implement the data processing method according to claim 1.

11. A display apparatus having a first storage space and a second storage space, the display apparatus comprising:

a display panel including a plurality of sub-pixels;

a backlight module disposed opposite to the display panel, the backlight module including a plurality of backlight units, each backlight unit corresponding to a position of at least one pixel; and the data processing apparatus according to claim 10.

12. A non-transitory computer-readable storage medium, having stored computer program instructions, wherein the computer program instructions, when executed by a computer, cause the computer to implement the data processing method according to claim 1.

13. A data processing apparatus applied to a display apparatus, the display apparatus including a display panel, a backlight module and a storage component, and having a first storage space and a second storage space, the display panel and the backlight module being disposed opposite to each other; wherein the display panel includes a plurality of pixels, the backlight module includes a plurality of backlight units, each backlight unit corresponds to a position of one or more pixels, the storage component is configured to store first backlight values of all backlight units;

the data processing apparatus is configured to:

in an (N−1)-th sliding window period, sample a backlight data set directly in the storage component by using a sliding window, and store all first backlight values of an N-th backlight data subset obtained through sampling in the first storage space; and in an N-th sliding window period, sample the backlight data set directly in the storage component by using the sliding window after moving, store all first backlight values of an (N+1)-th backlight data subset obtained through sampling in the second storage space, and calculate a compensation coefficient of at least one pixel, in pixels corresponding to an M-th row of backlight units, that corresponds to the N-th backlight data subset according to the N-th backlight data subset;

wherein the backlight data set includes first backlight values of at least one row of backlight units, the at least one row of backlight units includes the M-th row of backlight units, M is a positive integer, and (N−1) is a positive integer; and a moving step of the sliding window is first backlight values corresponding to a column of backlight units;

wherein the data processing apparatus is further configured to:

in the N-th sliding window period, calculate a compensation pixel value of the at least one pixel according to the compensation coefficient of the at least one pixel corresponding to the N-th backlight data subset and an initial pixel value of the at least one pixel in a frame image; wherein first backlight values of backlight units corresponding to the frame image are calculated according to initial pixel values of pixels of a previous frame of the frame image, the first backlight values of the backlight units corresponding to the frame image are configured to drive the backlight module to cause the display panel to display the frame image.

14. The data processing apparatus according to claim 13, wherein the data processing apparatus is further configured to:

in an (N+1)-th sliding window period, sample the backlight data set directly in the storage component by using the sliding window after moving, store all first backlight values of an (N+2)-th backlight data subset obtained through sampling in the first storage space, and calculate a compensation coefficient of at least one pixel, in the pixels corresponding to the M-th row of backlight units, that corresponds to the (N+1)-th backlight data subset according to the (N+1)-th backlight data subset.

15. The data processing apparatus according to claim 13, wherein the data processing apparatus is further configured to:

in a last sliding window period, calculate a compensation coefficient of at least one pixel, in the pixels corresponding to the M-th row of backlight units, that corresponds to a last backlight data subset according to the last backlight data subset of the backlight data set, and sample a next backlight data set of the backlight data set by using the sliding window after moving to obtain a first backlight data subset of the next backlight data set.

16. A display apparatus having a first storage space and a second storage space, the display apparatus comprising:

a display panel including a plurality of sub-pixels;

a backlight module disposed opposite to the display panel, the backlight module including a plurality of backlight units, each backlight unit corresponding to a position of at least one pixel; and the data processing apparatus according to claim 13.

17. The display apparatus according to claim 16, wherein the first storage space and the second storage space are located in at least one buffer of the display apparatus.

* * * * *